(12) United States Patent
Dornfeld

(10) Patent No.: US 10,068,299 B1
(45) Date of Patent: Sep. 4, 2018

(54) SYSTEM FOR PROVIDING TOURIST TRACKING ON A MOBILE DEVICE

(71) Applicant: Gary Dornfeld, Wellington, FL (US)

(72) Inventor: Gary Dornfeld, Wellington, FL (US)

( * ) Notice: Subject to any disclaimer, the term of this patent is extended or adjusted under 35 U.S.C. 154(b) by 0 days.

(21) Appl. No.: 15/860,050

(22) Filed: Jan. 2, 2018

(51) Int. Cl.
| H04W 24/00 | (2009.01) |
| G06Q 50/14 | (2012.01) |
| H04W 4/024 | (2018.01) |
| H04W 4/029 | (2018.01) |
| H04W 4/50 | (2018.01) |
| H04W 4/40 | (2018.01) |
| G06Q 30/02 | (2012.01) |
| G06Q 30/06 | (2012.01) |

(52) U.S. Cl.
CPC ............ *G06Q 50/14* (2013.01); *H04W 4/024* (2018.02); *H04W 4/029* (2018.02); *H04W 4/40* (2018.02); *H04W 4/50* (2018.02); *G06Q 30/0282* (2013.01); *G06Q 30/0631* (2013.01)

(58) Field of Classification Search
CPC .............. G06Q 50/14; G06Q 30/0631; G06Q 30/0282; H04W 4/40; H04W 4/50; H04W 4/029; H04W 4/024
USPC ....................................... 455/456.3
See application file for complete search history.

(56) References Cited

U.S. PATENT DOCUMENTS

| 6,266,614 B1 * | 7/2001 | Alumbaugh | ....... G01C 21/3644 701/468 |
| 2002/0011951 A1 * | 1/2002 | Pepin | ................... G09B 29/008 342/357.34 |
| 2008/0129528 A1 * | 6/2008 | Guthrie | .................. G09B 5/062 340/686.1 |

* cited by examiner

*Primary Examiner* — Huy C Ho
(74) *Attorney, Agent, or Firm* — The Rapacke Law Group, P.A.

(57) ABSTRACT

Embodiments described herein provide for a system for tourist tracking comprising at least one tourist, at least one vehicle, and at least one director each having a communications device and a GPS system in communication thereto. Tourists are provided with notifications alerting them to excursions created by the directors.

20 Claims, 40 Drawing Sheets

SYSTEM FOR PROVIDING TOURIST TRACKING ON A MOBILE DEVICE

FIELD

The present invention generally relates a system and method for tourist tracking utilizing a plurality of applications and mobile devices in unison.

BACKGROUND

The increased use of the internet, and specifically, the ability for personal electronic devices to connect to the internet almost anywhere has redefined the field of travel information. Endless pamphlets from the local travel agent are no longer needed or desired by travellers as this information can be found at the touch of a fingertip.

Many cities and businesses alike provide an array of travel options for tourists. These include simple walkabout tours, bus tours, among other implements to allow tourists to view a location under the direction of a knowledgeable guide. While tour guides are well known and utilized throughout the world, the adoption of technologies including the internet, global positioning systems ("GPS"), and network connectivity of tour vehicles, tour directors, and tourists alike is underutilized in the current arts.

AU Patent No. 2017/100942 to Benjamin K. Heller et al. discloses an Australian patent aimed at providing an easy, hassle free platform for tour guides offering, and tourists seeking out experiences. The unique selling proposition of the invention over traditional means provides for an easy method for tour operators, tour guides, or locals with experience and knowledge to connect with tourists, visitors, special groups, or even individuals looking for a particular tailored experience. Heller discloses an affordable invention with the ability for customers to request tailored experienced.

U.S. Pat. App. No. 2006/0068840 to Frank Sherman et al. discloses an event guide system to coordinate passenger transport and to provide event information including a transport vehicle, a host processor, and a portable processor remote from the host processor. The vehicle includes a processor capable of receiving event information and video data from the portable processor, as well as transmitting vehicle status data to the portable processor. The portable processor is capable of receiving the vehicle status data from the vehicle processor, as well sa transmitting the vehicle status data to the host processor. The host site operable to receive and store the vehicle status data.

Heller et al. fails to disclose any method for allowing a tourist to join an excursion that is currently in progress. Further, lending a personal electronic device ("PED") to the tourists is not disclosed. Sherman et al. fails to disclose the transmittal of push notifications relevant to the real-time progress of the touring excursion. Further, the tourists is unable to join an in-progress touring excursion.

U.S. Pat. App. No. 2002/0011951 to Gilles Pepin et al. discloses a portable tourist guide and guiding service. The portable guide has a GPS positioning module for determining its precise position, and a portable computer system. The computer correlates the device's position with the relevant touristic information of multimedia format, including digitized audio and visual data. Updatable data storage is provided so that the relevant information is stored in the device and may be updated as needed. A user interface is provided to gather instructions from a user and provide this user with the touristic information.

U.S. Pat. App. No. 2014/0278861 to Hoppy, Societe a Responsabilite Limitee discloses a mobile device to supply information, notably for tourism, to a user, has a storage device that is fragmented into sectors, each sector corresponding at least to one given geographic location and showing an address, a tracker of said device, capable of delivering positioning information, corresponding to the location wherein the device is situated, a processor capable of drawing up a reading instruction containing at least the address of the sector of the information to be supplied in a relation the positioning information on the basis of one or several correspondence table.

WO Pat. No. 2011/161664 to Shimon Messika et al. discloses a system for providing information and/or services to tourists traveling in a foreign country, which comprises a plurality of dedicated cellular mobile devices used by tourists traveling in a foreign country. Each device has a user interface which is configured to display menus to a tourist in his own native language, for allowing the tourist to select desired information and/or services. A call center is in cellular communication with the devices and that uniquely identifies the profile of each tourist who initiates an incoming call, according to data stored in hos mobile device and automatically directs the incoming call to an operator who communicates with the tourist in his own native language, for providing verbal and textual desired information to the tourist and for acquiring desired services for the tourist from trusted service providers.

WO Patent No. 99/60548 to Dov Graugen et al. discloses a guiding apparatus, particularly for use by tourists. The apparatus is provided with memory for storing relevant information (maps and background) about the touring sites, possibly assembled and edited by the user from the Internet. A built-in GPS prompts the information for each site in synchronization with the actual sight-seeing time thereof.

It can be seen that an advancement in the arts of tourists tracking, and providing information thereto utilizing personal electronic devices is needed. Embodiments of one such advance are provided herein.

SUMMARY OF THE INVENTION

Embodiments described herein provide for a system related to tourist tracking. The system is a cross platform application accessible by PED operating systems. Three separate user interfaces are utilized including a vehicle-associated system, a director (tour guide) associated system, and a tourist-associated system. A vehicle-associated user having a communications device with a GPS system is positioned on the vehicle. The director has a PED with a GPS in communication with the PED. Further, at least one tourist has a communications device having a third GPS in communication thereto. A network connects each user along with a database and server. Processors at each device operate in a plurality of processes specific to each user.

The vehicle user interface executes instructions to register a vehicle. The user may then enable the vehicle communications device to locate each tourist. The vehicle may be tracked by the network and vehicle location may be transmitted throughout.

The director interface executed instructions to create an excursion as well as locate each tourist. The director may send and receive notifications to and from the user as well as generate directions to send to the tourist utilizing the GPS systems. Optionally, the director may lend an electronic device to one or more tourists in order for tourists to utilize the system effectively.

The tourist user interface permits the user to join an upcoming, or in progress excursion. The tourist may send and receive notifications to other users in the network as well as receive directions to the vehicle, or recommended attractions. In embodiments, current weather, photos and photo galleries, surveys and special needs are viewable on the user interface.

In an embodiment, an administrator utilizes a computer configured to communicate with the network. The computer has a processor in communication with a user-interface operable to perform processing including managing tourists, directors, excursions, and vehicles as well as generating reports related to each of the tourists, directors, excursions, and vehicles. The administrator may also modifying network settings.

In an embodiment, a plurality of recommended attractions associated with the excursion are provided. Each of the plurality of recommended attractions are within a predetermined distance from the excursion such as to remain relevant to the instant excursion.

In an embodiment, the director may view a map having icons depicting specific locations of tourists utilizing the system.

Other aspects, advantages, and novel features of the embodiments will become apparent from the following detailed description in conjunction with the figures.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only and no unnecessary limitation or inferences are to be understood therefrom.

In general, the invention described herein relates to a cross platform hybrid application that may be implemented with Android, IOS, or similar operating systems generally used on personal electronic devices ("PED"). Three main users are in communication within the network. The three user categories include the system related to a vehicle, a director, and a tourist. A system administrator may also be in communication with the network. Each user is able to send and receive information throughout the network utilizing an electronic device such as a PED, computer, laptop, tablet, or similar implement.

The tourist tracking system includes one or more processors to process data and at least one memory to store data within the system environment. Memory may be a server associated database management system within the memory.

Figure 1:
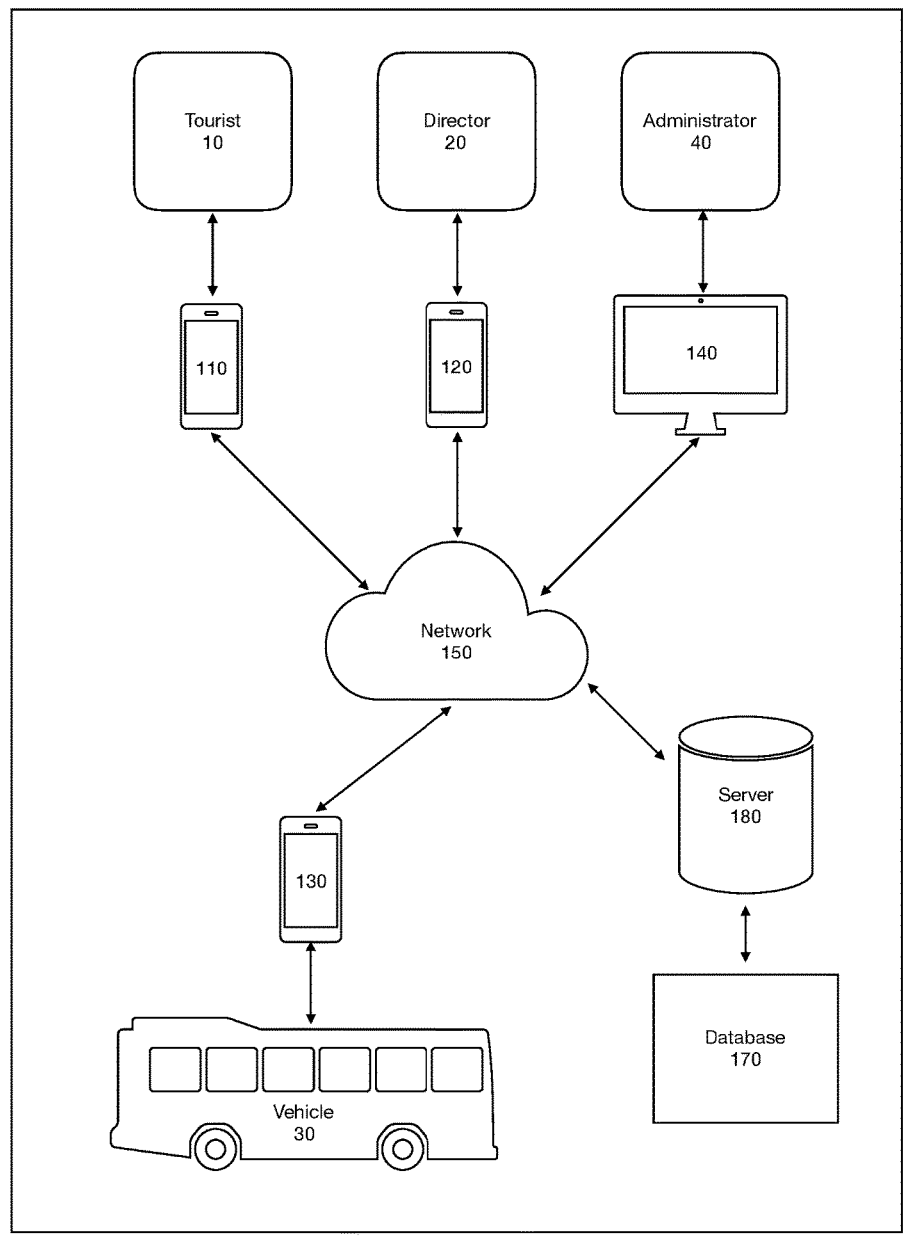
FIG. 1 is a block diagram of a tourist tracking system, according to an embodiment of the present invention.

FIG. 1 illustrates an exemplary system for tourist tracking in an embodiment of the present invention. The system 100 may include at least one tourist device 110, at least one director device 120, at least one vehicle-associated device 130, and at least one administrator-associated device 140. Each device 110, 120, 130, and 140 is in wireless communication with one another over a network 150. Further, each device may be comprised of a plurality of processors, memory units, transmitters, and receivers.

The tourist device 110, may be any portable personal electronic device such as a cellphone, PDA, tablet, or similar device that may wirelessly access the network. The tourist device is configured to send and receive data through the network 150. The tourist device should have GPS connectivity either integral with the device or in communication thereto. The GPS system 115 permits the system and users thereof to track the specific location of the tourist. This permits the tourist 10, director 20, vehicle 30, and administrator 40 to send, process, store, and receive location data, or send and receive directions related to the specific location of the tourist as determined by the tourist-associated GPS system 115.

The vehicle-associated device 130 may be a static or portable electronic device configured to send and receive data throughout the network. The vehicle-associated device 130 may be mounted to the vehicle such that the specific location may be tracked using a vehicle-associated GPS 135 system in communication with the vehicle-associated device 120. This allows data related to the specific location to be sent, transmitted, processed, stored, and received throughout the network 150. Vehicle conditions and excursion data may be monitored and transmitted to the tourists 10, directors 20, and administrators 40.

The director-associated device 120 may be defined as any portable PED known in the arts such as a cellphone, PDA, tablet, or similar device having the capability of wireless connectivity with the network 150. A director-associated GPS system 125 may be integrally or wirelessly in communication with the director-associated device 120 such that the specific location of the device 120 may be sent, received, transmitted, and processed.

The administrator-associated device 140 may be any computer, whether portable or static, which permits the administrator 40 to be in communication with the system 100.

A database 170 is configured to store data related to the system. The database may be in communication with a server 180 to send and receive data to and from the network 150.

A vehicle 30 may be embodied as a tour bus, tour van, or similar implement commonly used to provide transportation to a plurality of tourists and guides (directors) alike. It can be understood that differing tourist options may require alternate forms of transportation including bicycles, motorcycles, watercraft, aircraft, among other means of transportation utilized in the arts.

A director 20 may be defined as a tour guide or other individual providing directions and information related to the touring excursion. This director may be in-person or remote in addition to being in wireless communication with the tourists.

The tourists 10 are users who engage in an excursion activity. In an example, the excursion activity may be a bus tour of San Francisco wherein a tour guide (e.g. the director) rides along with a group of ten tourists at a time and provides information related to the city and attractions along the way. The application permits tourists 10 along the excursion route, or within a radius thereto, to be notified of the ongoing excursion allowing tourists to join the ongoing excursion. Further, should any tourist have missed the stated departure time, appropriate alerts may be sent to the tourist 10.

An excursion may be defined as any activity engaged in by the tourists wherein a vehicle and tour guide (director) are utilized.

Tourist Tracker for Vehicles

Figure 2:
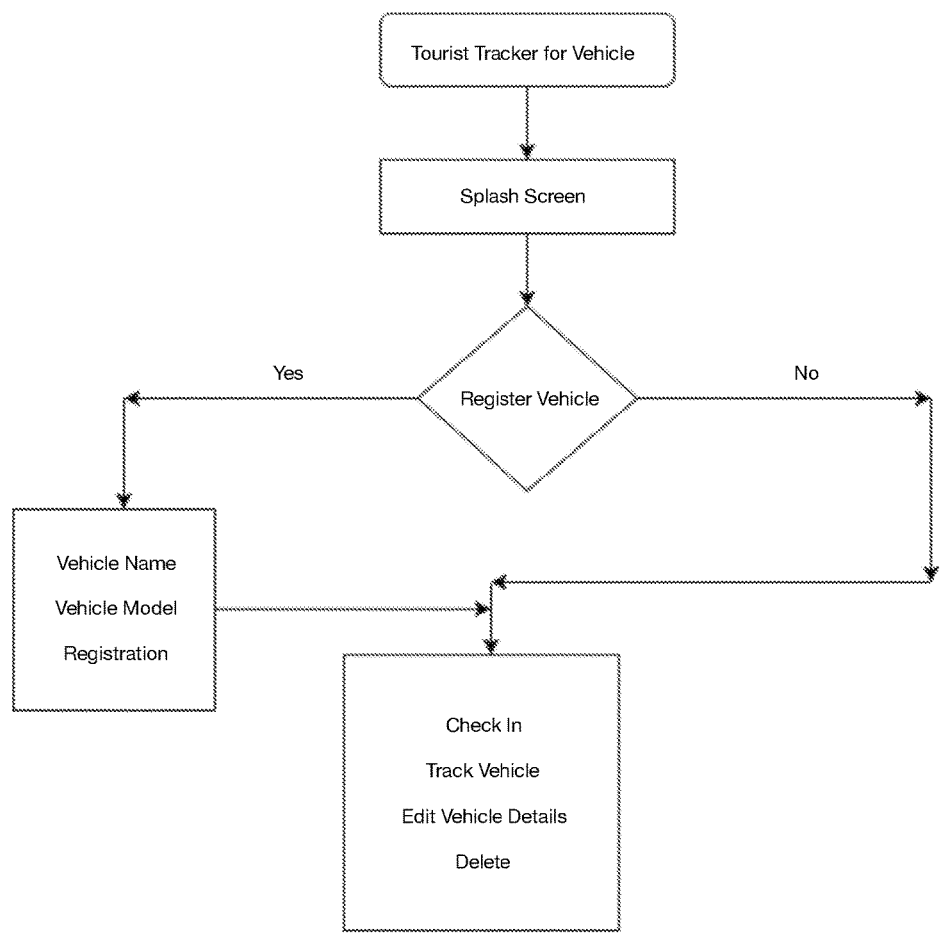
FIG. 2 is a flowchart of a tourist tracking system related to the vehicle-associated user, according to an embodiment of the present invention.
Figure 3:
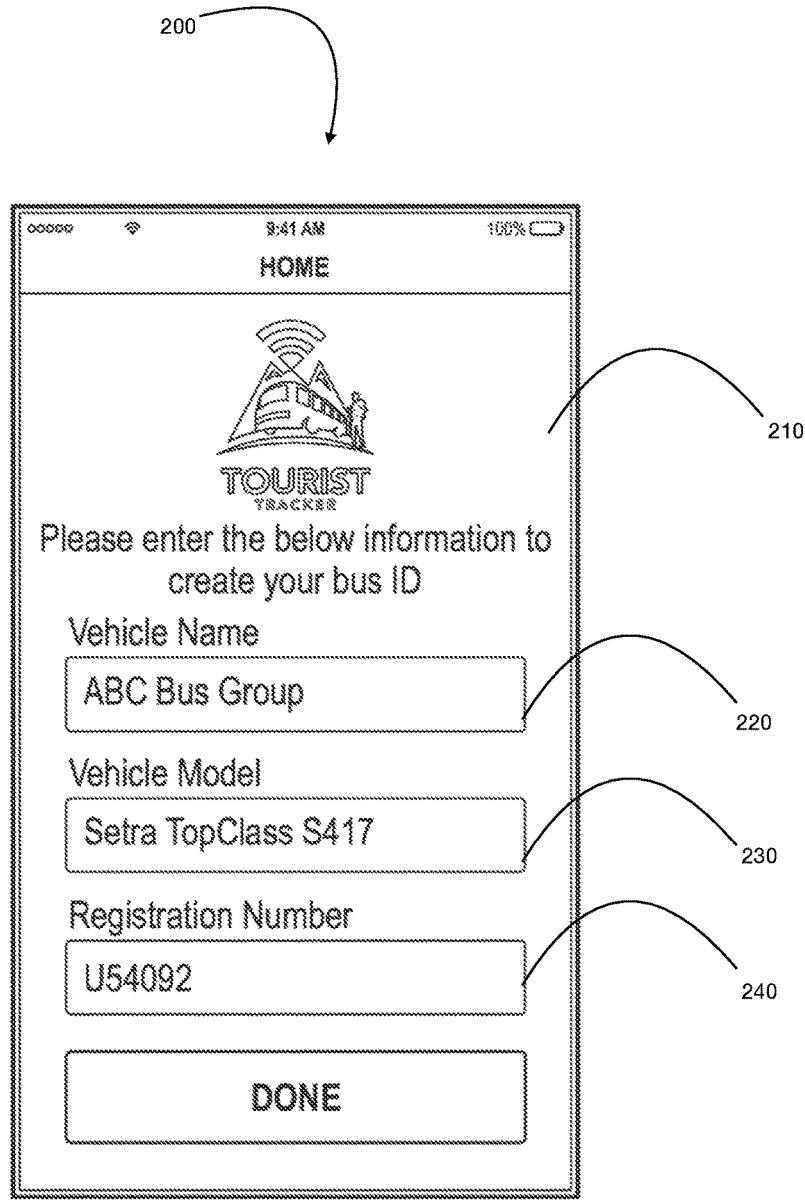
FIG. 3 illustrates a schematic representation of a screenshot of a tourist tracking system from the perspective of the vehicle-associated user, according to an embodiment of the present invention.

FIG. 3 illustrates a screenshot of a user-implemented process related to the application interface for a vehicle-associated user. A process implemented by the vehicle-associated user 130 is illustrated in FIG. 2. In step 1, the user 30 registers the vehicle as described above. In step 2 the user 30 enables the vehicle-associated communications device 130 to locate each of the at least one tourist 10 followed by tracking the vehicle throughout the excursion in step 3. Once the user is identified as a vehicle-associated user 30 the system displays a "Splash Screen" on the vehicle GUI 200 having a preselected image related to the application. This splash screen, as commonly referred in the arts, may be used as a intermediary screen throughout the navigational processes of the GUI 200. A registration screen 210 may be shown permitting the vehicle-associated user 30 to register a new vehicle, leading to a vehicle registration page. If the vehicle has been previously registered, the user is directed to a home page. Further details of processes related to the vehicle-associated user are described below and illustrated in FIG. 4 as a flowchart.

A static device may be positioned on the vehicle 30. The static communications device 130 may be configured to add/edit and register vehicle details specific to the particular vehicle, provide a check-in/check-out feature for the tourists, as well as provide a tracking feature allowing the system to track the position of the vehicle. The static device may include a Global Positioning System ("GPS"), a plurality of receivers and transmitters, an electronic display, and Graphical User Interface ("GUI"). The static device is configured to permit the download of the tourist tracking application thereon.

Upon initial download of the tourist tracking application, and in specific reference to FIG. 3, the vehicle-associated user 30 is prompted to a screen by the GUI 200 permitting the user to input vehicle details including <vehicle name> 220, <vehicle model> 230, and <registration number> 240. Each vehicle detail is input by the vehicle-associated user in an input field, typically configured to receive information through a keyboard on the GUI 200. One skilled in the art may appreciate that any number of vehicle details may be input including driver identification, tour details, and additional vehicle identifiers known in the arts. Vehicle registration details may be transmitted to a database wherein information regarding the vehicle is stored.

Following vehicle registration, or in the instance where the vehicle has already been registered, the GUI provides the user with the option to view the vehicle credentials including vehicle name, vehicle model, and registration number.

In an embodiment, the vehicle-associated user is provided the option to "Check-In" if this feature is enabled. When "Check-In" is enabled, the system communicates with the GPS system on the vehicle device to determine the location of the vehicle as well as additional details associated with the vehicle, and tourists thereon. Further information transmitted by the vehicle device may include number of tourists, tourist locations, tour information, and information received from the tourists on the vehicle.

The vehicle device is in wireless communication with the director such that the director has direct access to information related to the vehicle device among other data related to the vehicle and each tourist thereon. For example, the director may have access to tourist names, locations, excursion details, vehicle registration and location, and itineraries. In embodiments, current and/or future weather information may be displayed for the excursion route.

A "track vehicle" feature allows any user, including administrators, directors and tourists to track the current location of the vehicle. In an embodiment, users within a predetermined distance (for example 30 meters) from the vehicle may be sent an alert message to notify the user of an excursion opportunity.

In an embodiment, the vehicle-associated user is provided the opportunity to edit or delete existing vehicle details.

Tourist Tracker for Director

Figure 4:
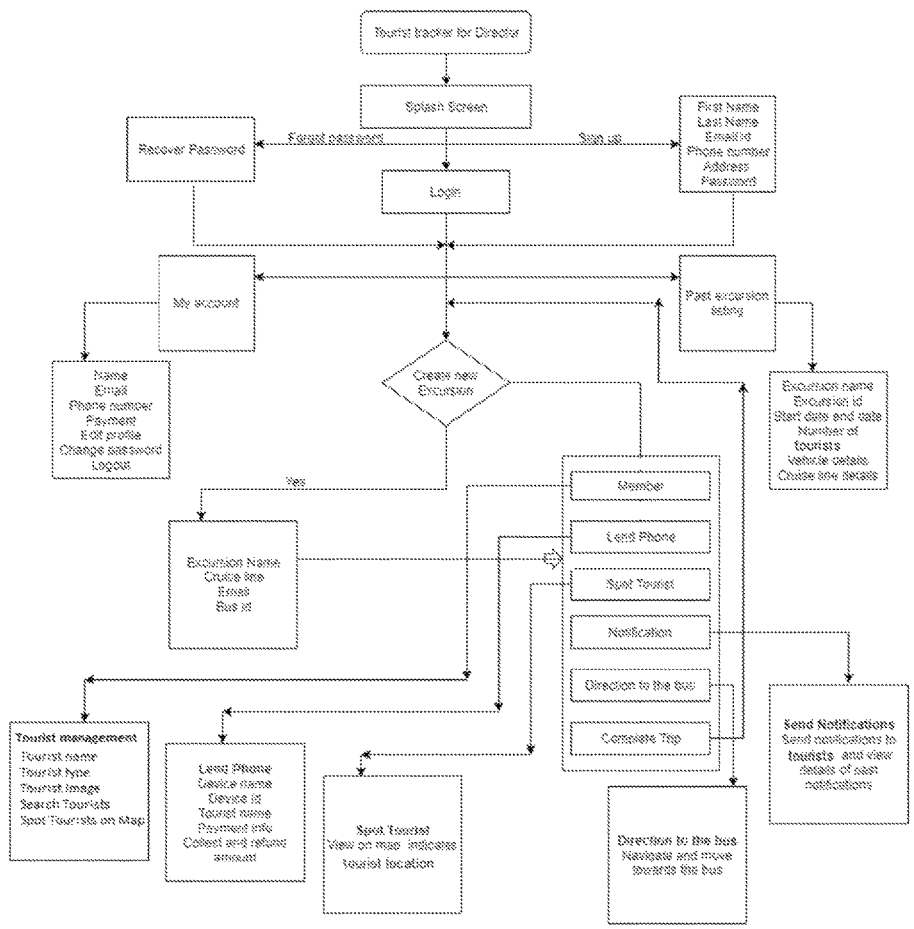
FIG. 4 is a flowchart of a tourist tracking process related to the director, according to an embodiment of the present invention.

A flow chart is illustrated in FIG. 4 relating to a user-implemented process for users who identify as a director within the system. In step 4, the user 20 creates an excursion. In optional step 5 the director 20 lends an electronic device to one or more tourists 10. In step 6 the director locates each of the at least one tourists utilizing the GPS systems 115, 125, 135. In step 7 the director sends and receives notifications to and from the tourists 10. In step 8 the processor generates directions utilizing at least one of the first 115, second 125, or third GPS systems 135.

Figure 6:
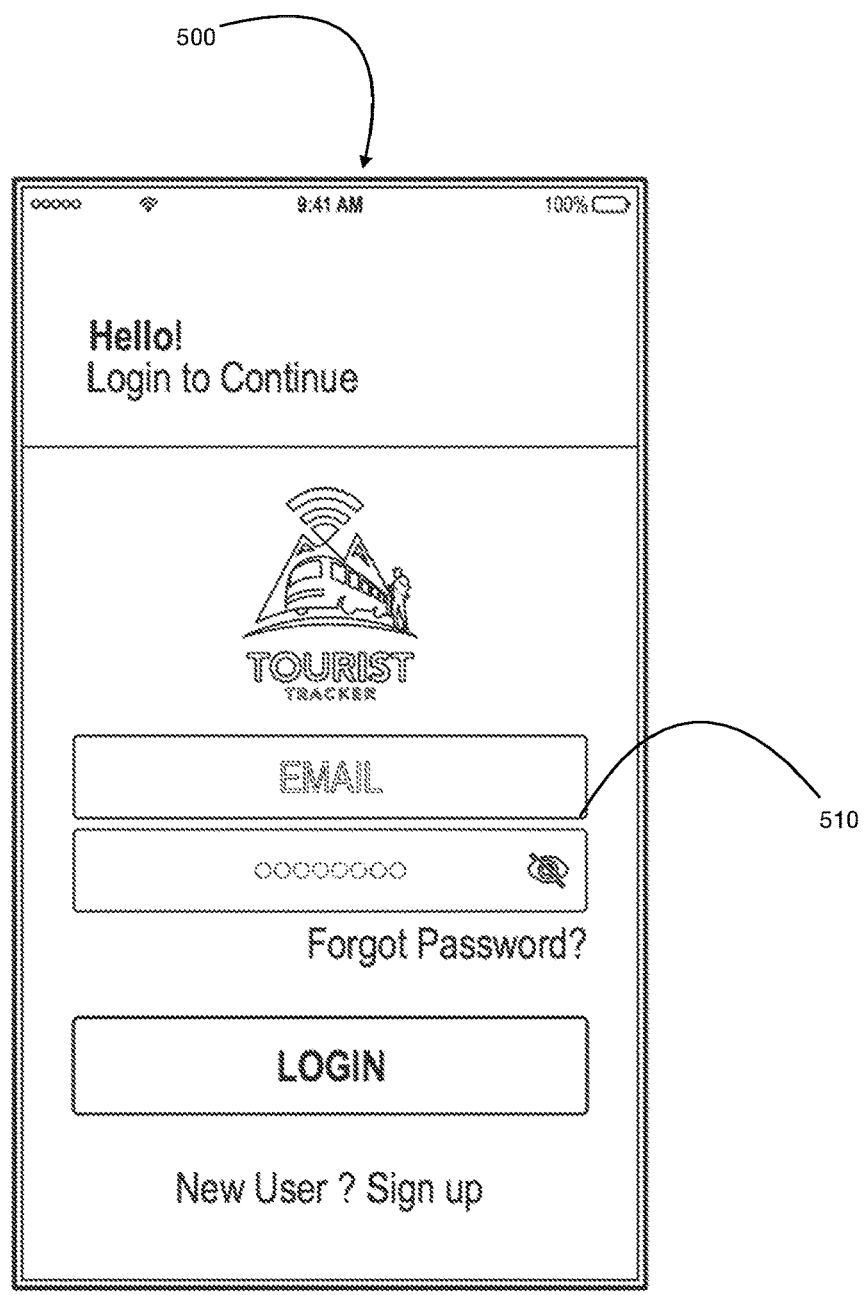
FIG. 6 illustrates a schematic representation of a screenshot of a tourist tracking system, according to an embodiment of the present invention.

Further details of the process may be seen in FIGS. 6-20 related to the tourist tracker for the director GUI 500. Upon downloading the application, a splash screen is displayed. Following the splash screen, the user may login utilizing the credential input fields 510, sign up, or elect that credentials have been forgotten. If the director 20 is utilizing the application for the first time, a sign-up screen is displayed requiring the user to input a plurality of credentials as known in the arts. The user 20 is then transferred to a login screen (see FIG. 6) once credentials are established. If the director has previously created an account and remembers their specific credentials, the login screen is automatically displayed. In the instance that credentials are forgotten, the director may elect to recover their password as known in the arts. Following password recovery, the director 20 is displayed the login page where appropriate credentials are entered.

Once the director 20 has accessed their account following credential verification, the user may view a plurality of selectable options 620, 630, 640 listed on the GUI 500. In the instance that the director selects a "My Account" 640 feature, the director my view account details as known in the arts and further exemplified in FIG. 12 Past excursion listings 901 (see FIG. 10) may also be viewed including selectable fields related to data associated with a plurality of excursions. These fields are exemplified in FIG. 9.

Figure 7:
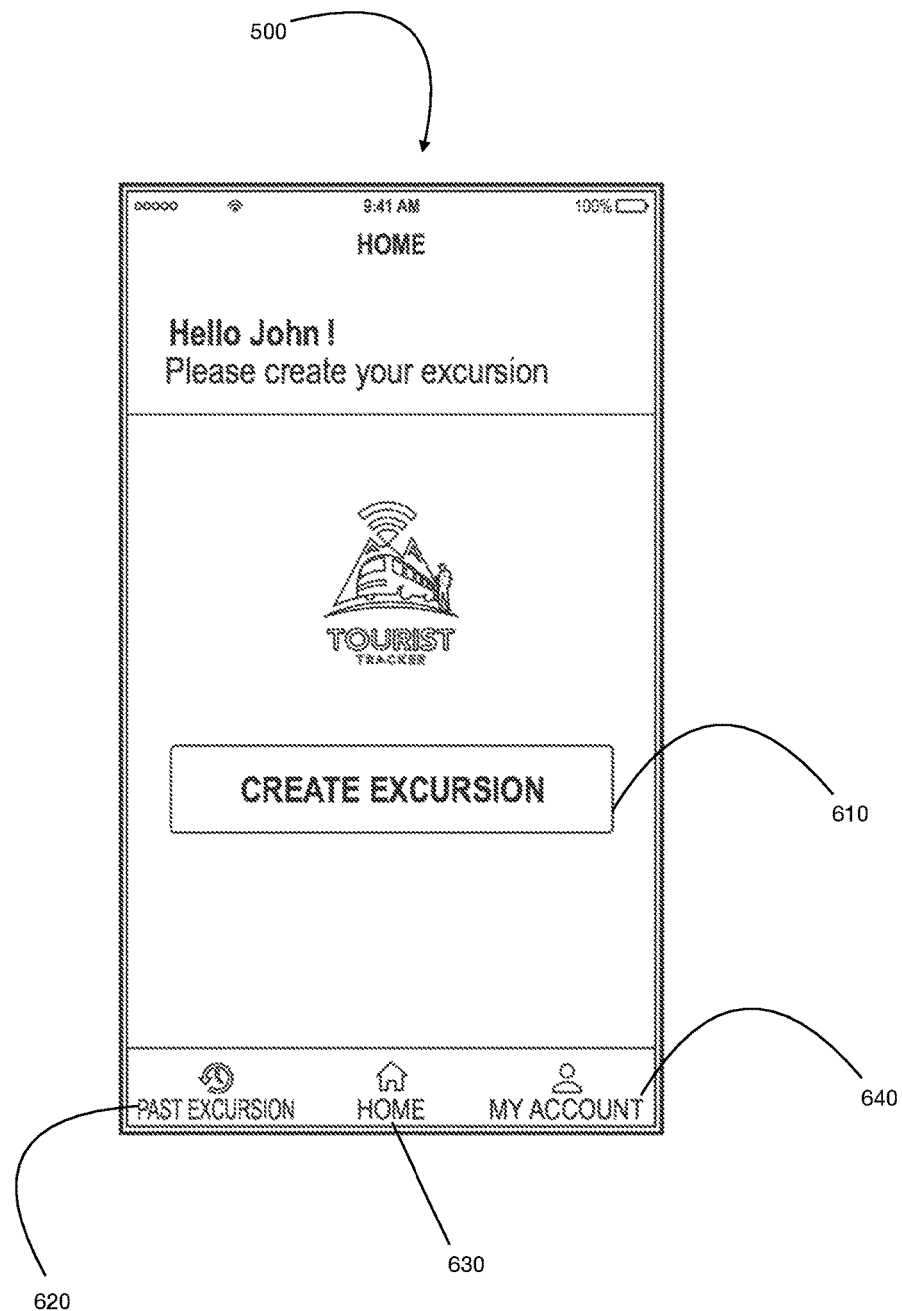
FIG. 7 illustrates a schematic representation of a screenshot of a tourist tracking system from the perspective of the director, according to an embodiment of the present invention.
Figure 9:
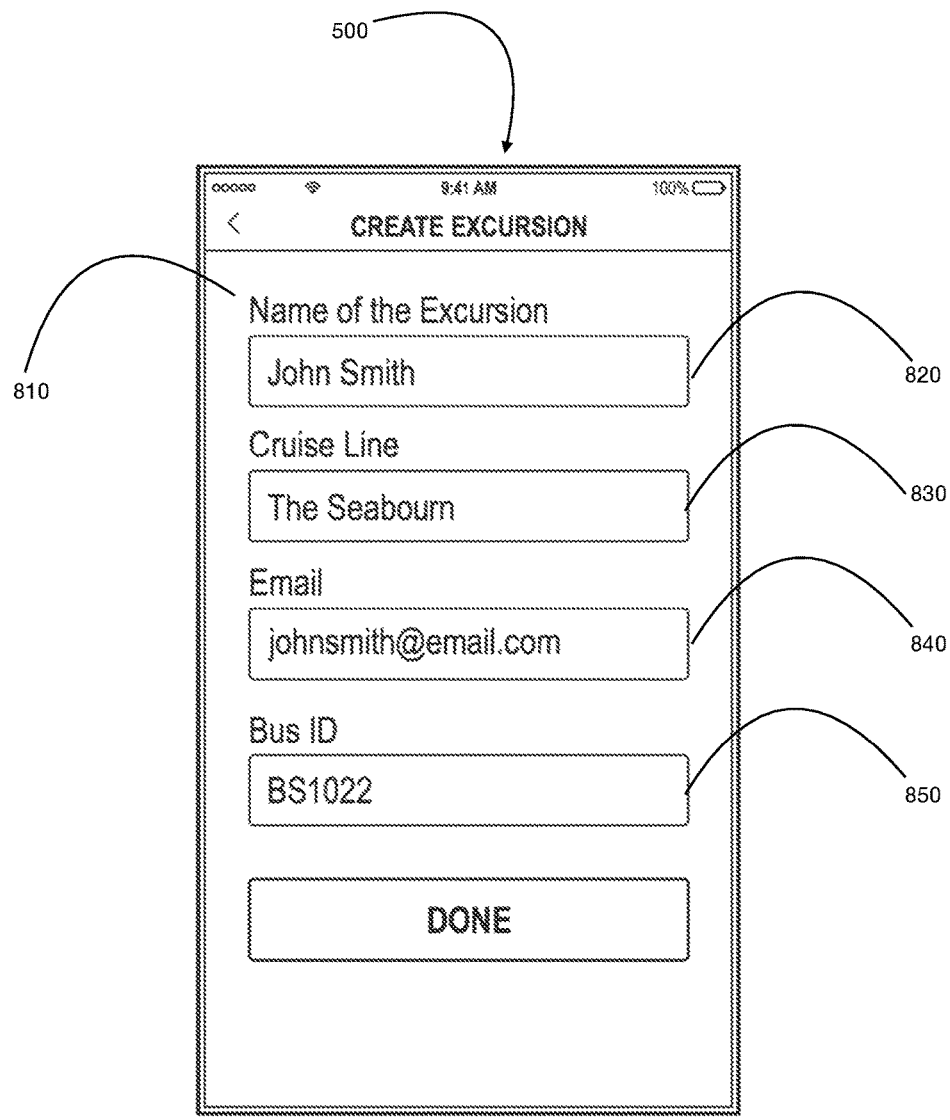
FIG. 9 illustrates a schematic representation of a screenshot of a tourist tracking system from the perspective of the director, according to an embodiment of the present invention.

Following Login, the director may select a create a new excursion feature 610 as illustrated in FIG. 7 requiring the director to input a plurality of excursion details to identify the specific excursion. FIG. 9 illustrates the screen wherein the director 20 inputs excursion credentials 810. Once an excursion has been created and verified, a plurality of selectable options are presented including member, lend phone, spot tourist, notification, directions, and complete trip. Each selectable option prompts the director with processes and metrics related to the specific selectable option.

A new director may first download the director-related application onto a PED having network connectivity. The new director may be prompted to enter valid credentials such as an email, username, password, or other credential commonly utilized in the arts. The GUI provides the user with a plurality of input fields for inputting these credentials including; <first name> <last name> <email address> <phone number> and <password>. Once credentials are input, the director may be prompted to login to the system utilizing the director-specific credentials. The GUI may also provide means of password recovery as known in the arts. The password recovery may necessitate an email entry and valid entry of a verification code transmitted to the email. Further, credentials such as the password may be changed at any time once the director has a successful login attempt.

Figure 8:
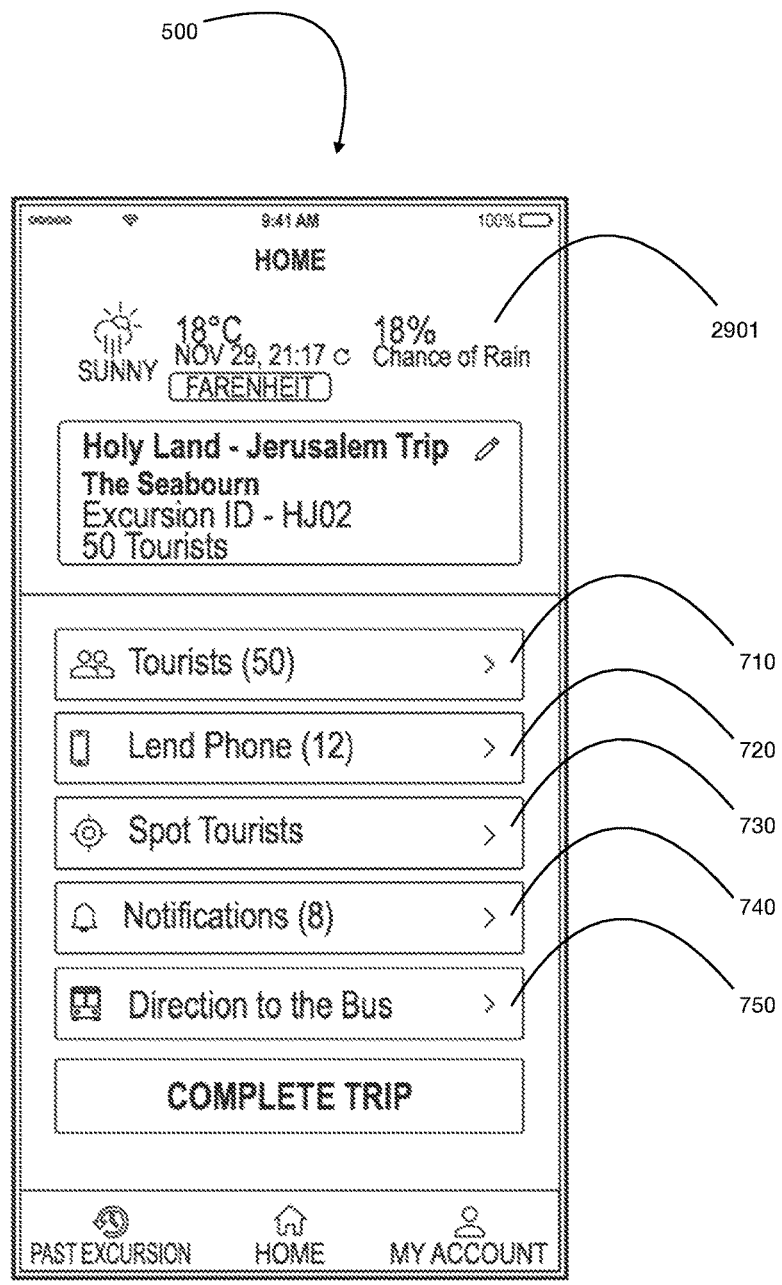
FIG. 8 illustrates a schematic representation of a screenshot of a tourist tracking system from the perspective of the director, according to an embodiment of the present invention.

In reference to FIG. 8 and FIG. 9, the director 20 is in control of the excursion scenario by utilizing the following features provided by the GUI: "create excursion" 610, "View/Manage Tourists" 710, "Lend Device" 720, "Spot Tourists" 730, Notifications" 740, and "Send Directions" 750.

Figure 11:
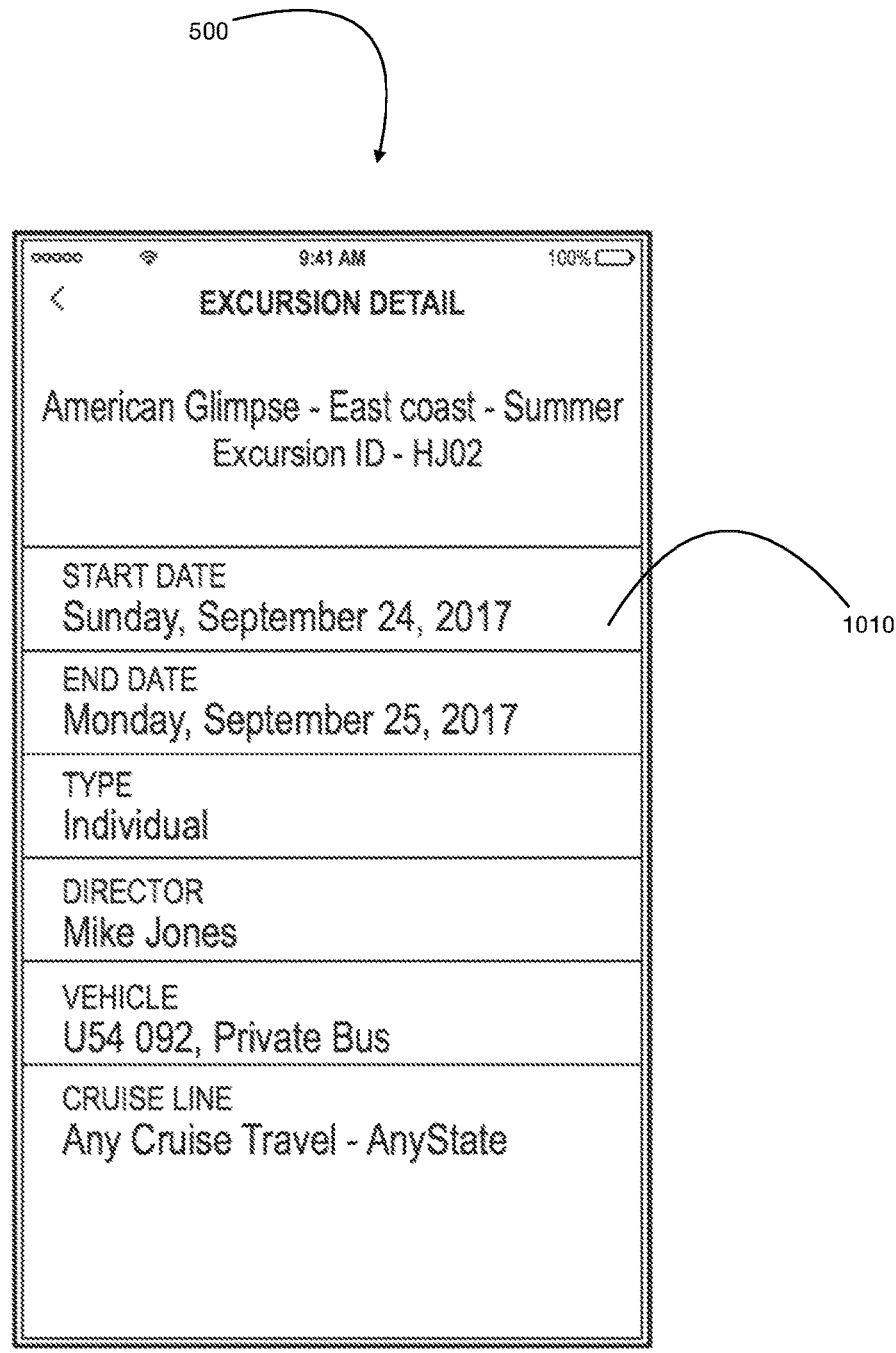
FIG. 11 illustrates a schematic representation of a screenshot of a tourist tracking system from the perspective of the director, according to an embodiment of the present invention.

Once the director 20 has a successful login, the GUI 500 provides one or more home pages. A first home page may be categorized as a "home screen before creating an excursion". The first home page is provided when there are no current or existing excursions for the specific director. Here, the director 20 is provided the option to create a new excursion 610 prompting the user to enter excursion details 810 as illustrated in FIG. 9 and FIG. 11. A second home page may be categorized as a "home screen after creating an excursion". The second home page is provided when the director is currently pursuing their specific excursion. The director is only permitted to engage in a single excursion at a time. Once the excursion is completed, the option to engage in a new excursion is provided.

During an excursion, the director 20 is provided with a plurality of features including; Information related to the excursion, edit excursion details 810, view tourists in excursion (see FIG. 13), lend device (see FIGS. 16-18), spot tourists (see FIG. 15), give notifications (see FIG. 19), send/receive direction to or from the vehicle associated with the excursion, complete excursion, view details of prior excursions, and view profile. Weather information may also be provided (see FIG. 5 and FIG. 8). Each feature is presented by the GUI as a selectable tab. Information related to the excursion may include details such as excursion name, cruise line, excursion ID, and number of tourists.

Figure 5:
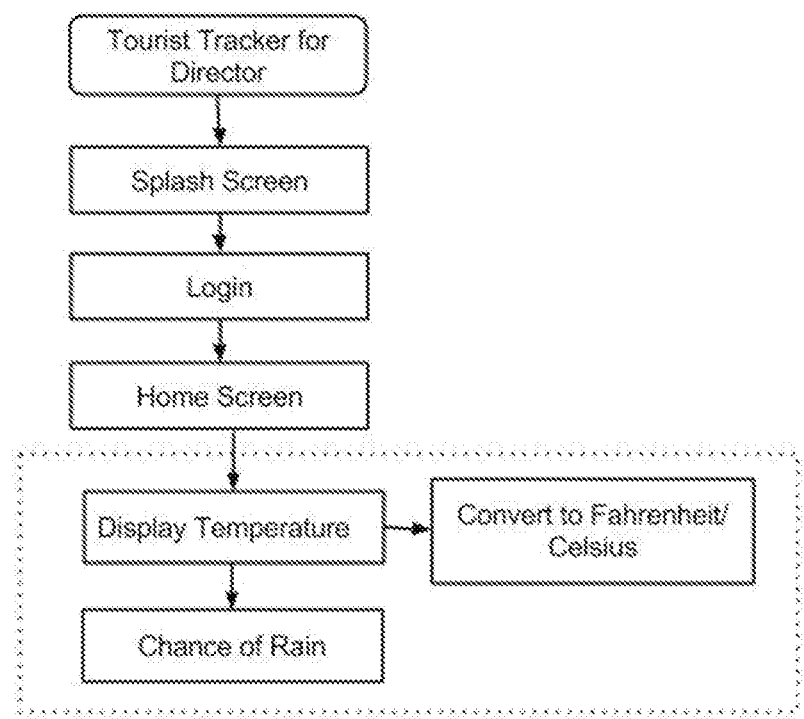
FIG. 5 is a flowchart of a tourist tracking process related to the director and specifically related to the weather display module, according to an embodiment of the present invention.
Figure 29:
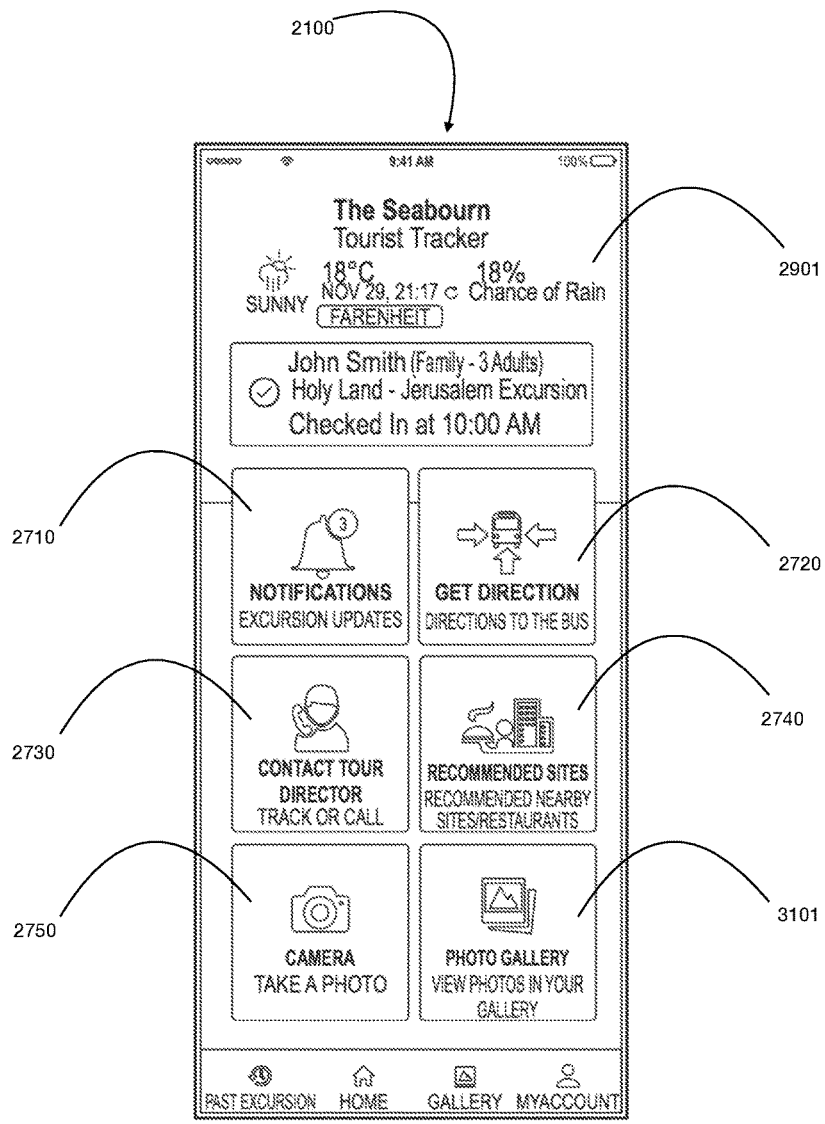
FIG. 29 illustrates a schematic representation of a screenshot of a tourist tracking system from the perspective of the tourist, according to an embodiment of the present invention.

FIG. 5 illustrates a flowchart for the weather display module 550. While one skilled in the art may appreciate that a plurality of weather metrics may be displayed, the instant embodiment will display the temperature as either Fahrenheit or Celsius as determined by user preference. Further, the GUI 200 may display sunny, cloudy, rainy, as well as other conditions as a weather icon FIG. 8 on a plurality of screens throughout the interface (see FIGS. 8 and 29).

In reference to FIG. 8, selecting the option to "Create Excursion" as seen on FIG. 7 prompts the director to input a variety of fields including; name of the excursion 820, cruise line (vehicle name) 830, email 840, and vehicle ID 850 (as generated by the registration of the vehicle). Once all fields are completed, the director will be able to view the second home page.

Figure 10:
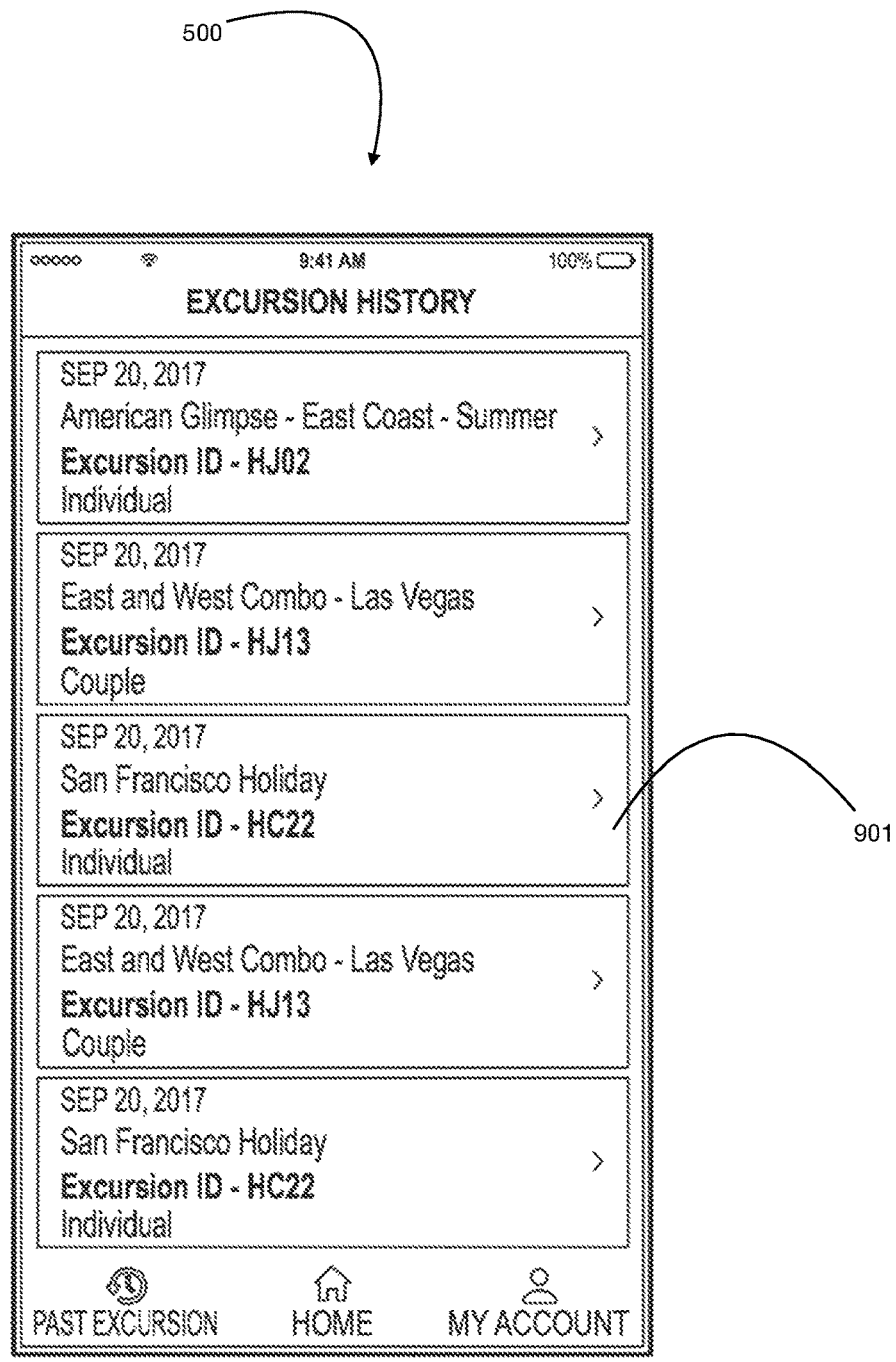
FIG. 10 illustrates a schematic representation of a screenshot of a tourist tracking system from the perspective of the director, according to an embodiment of the present invention.

In an embodiment, the director may be able to select the option to view completed excursion details 1010 (see FIG. 11). This may include an excursion history 901 as illustrated in FIG. 10. Selecting a specific completed excursion provides the user with specific excursion details including dates and time of excursion, name and excursion ID's, number of tourists, vehicle details, and cruise line details.

Figure 12:
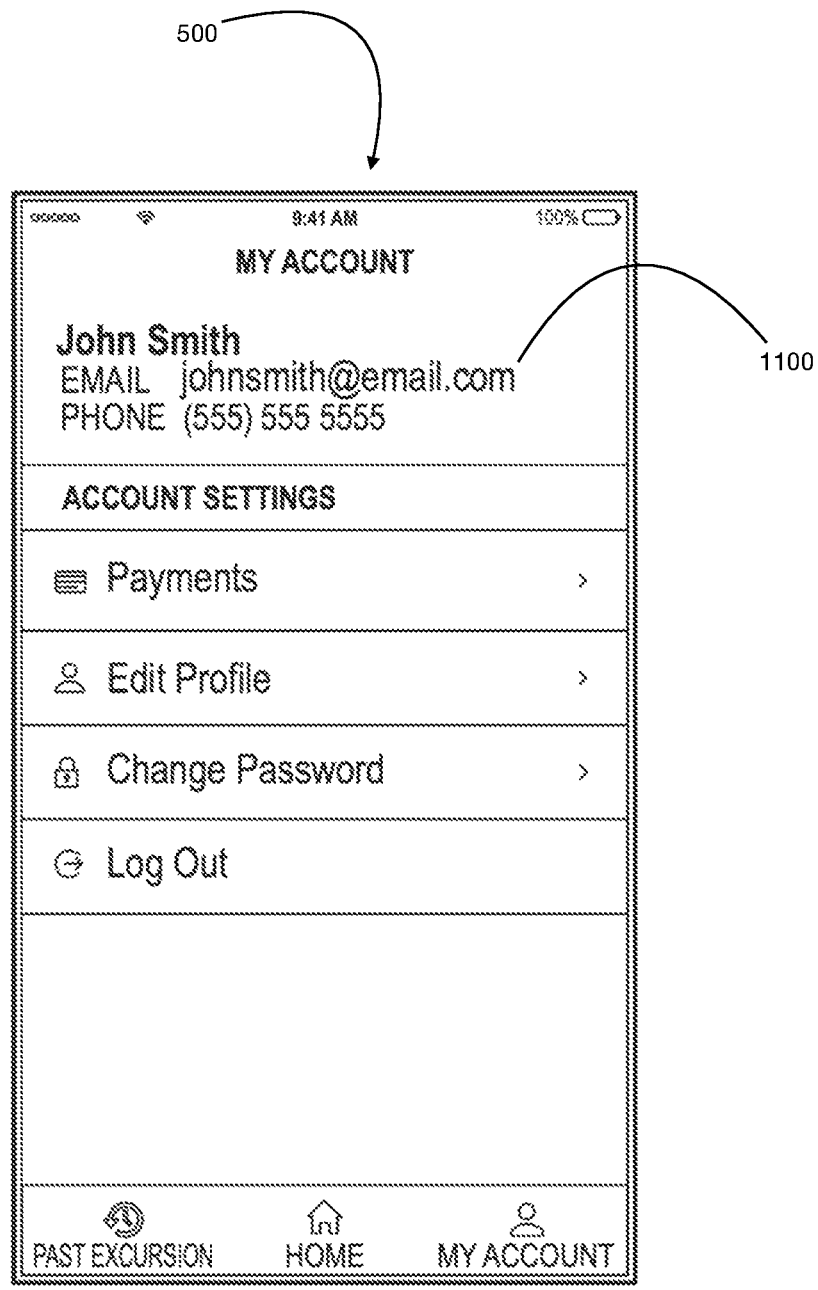
FIG. 12 illustrates a schematic representation of a screenshot of a tourist tracking system from the perspective of the director, according to an embodiment of the present invention.

In reference to FIG. 12, a director account page 1100 may include information including director name, email or user ID, password, phone number, payment details, edit options, and the option to modify user credentials.

Figure 13:
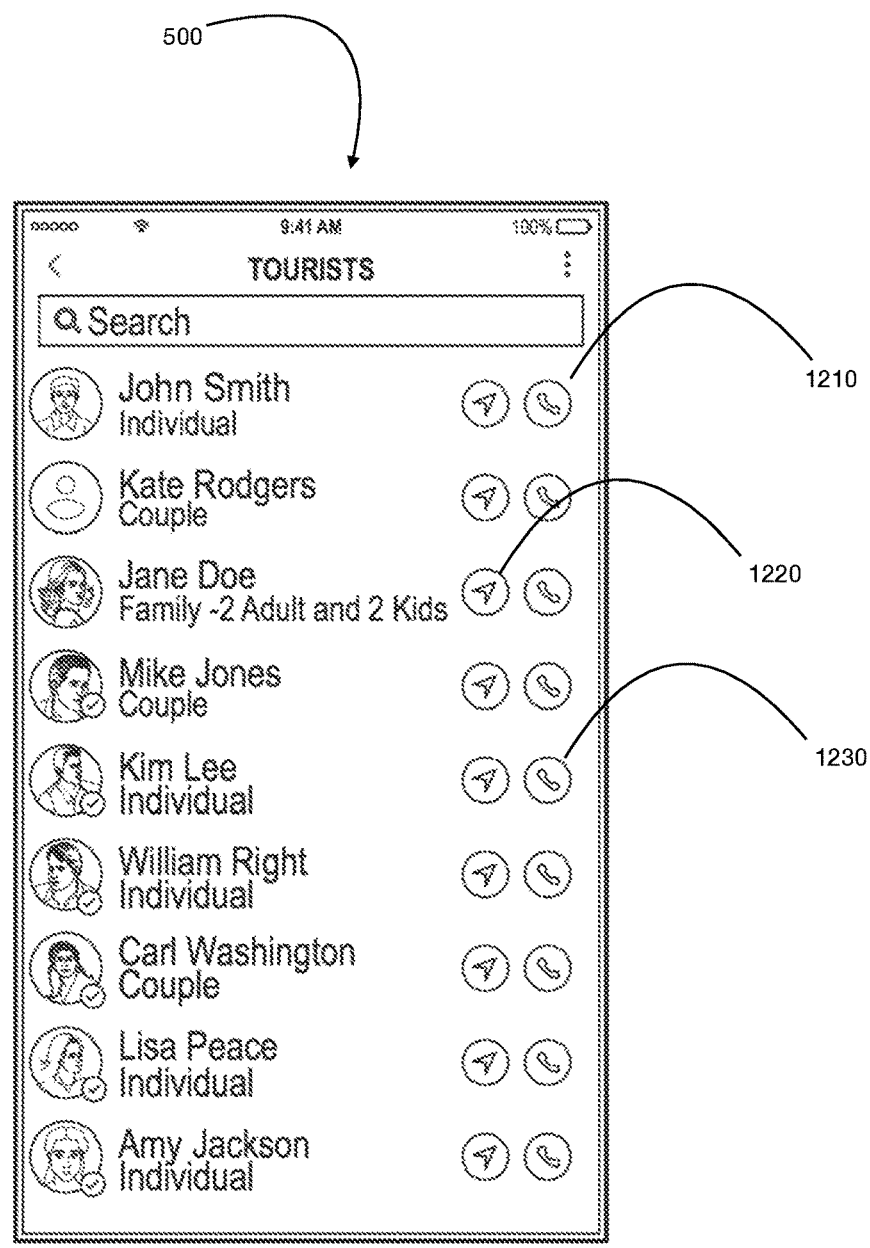
FIG. 13 illustrates a schematic representation of a screenshot of a tourist tracking system from the perspective of the director, according to an embodiment of the present invention.
Figure 14:
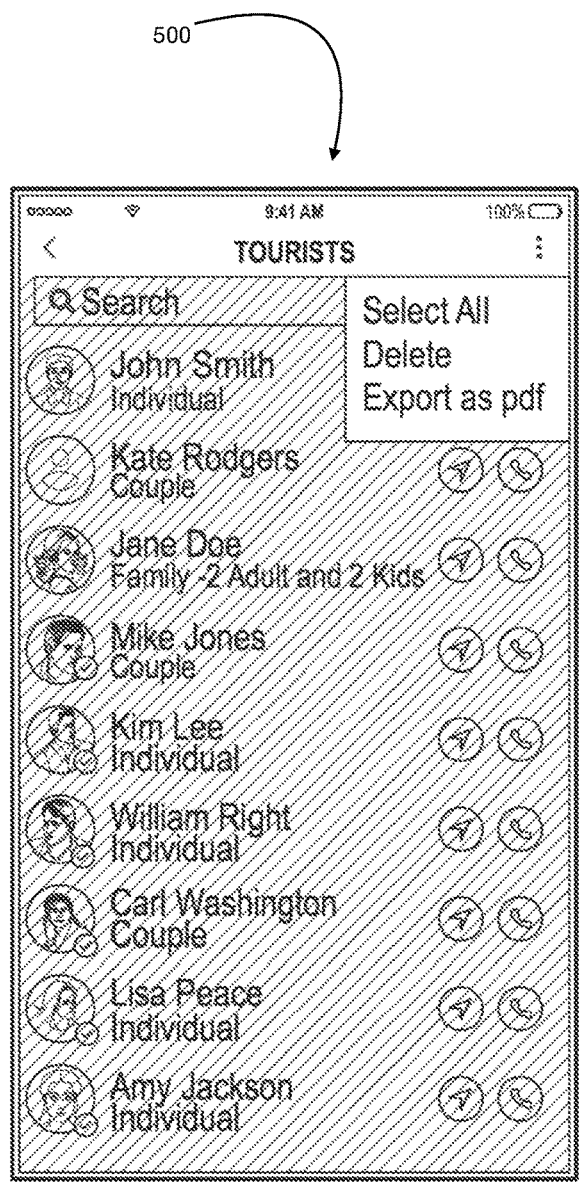
FIG. 14 illustrates a schematic representation of a screenshot of a tourist tracking system from the perspective of the director, according to an embodiment of the present invention.
Figure 20:
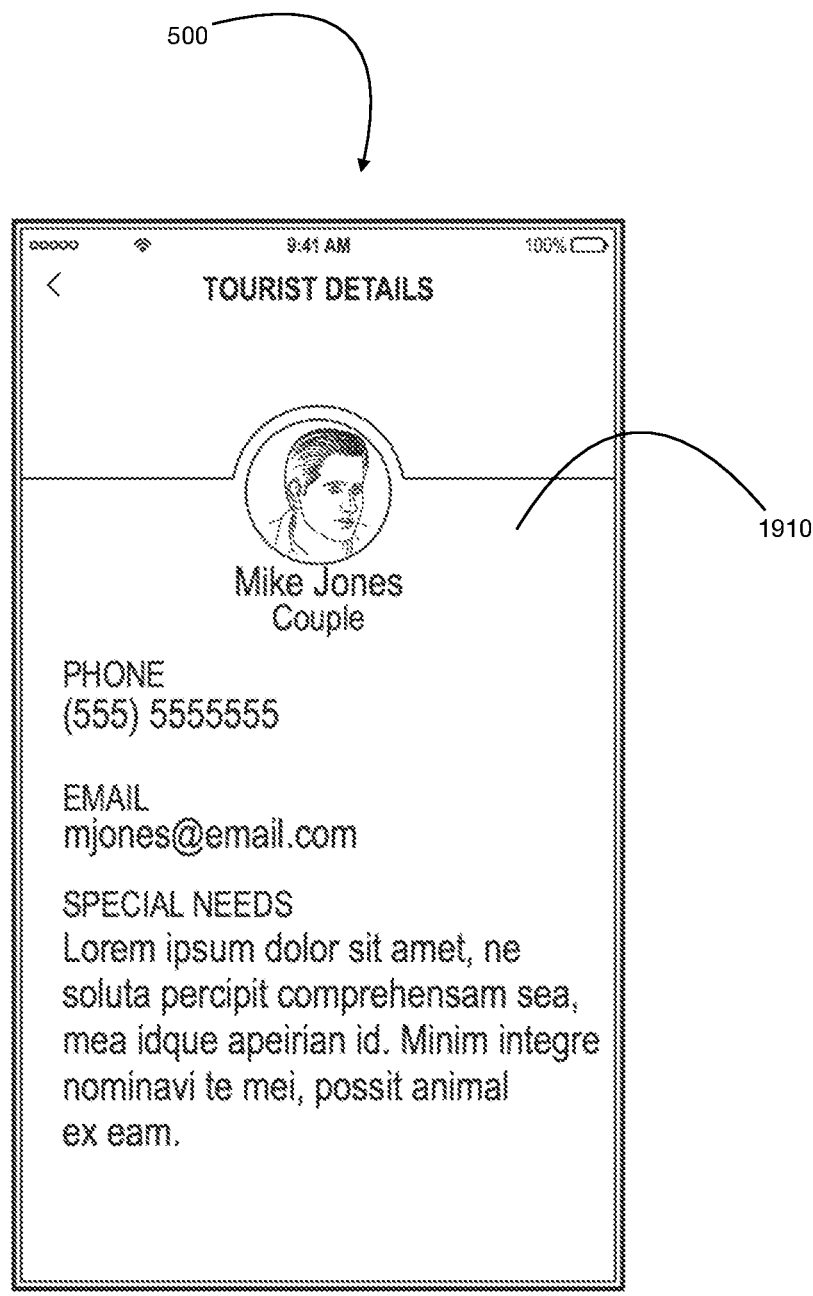
FIG. 20 illustrates a schematic representation of a screenshot of a tourist tracking system from the perspective of the director, according to an embodiment of the present invention.

Now referring to FIG. 13 and FIG. 20 The director may choose to view and manage information related to tourist management. The director may select to view a tourist listing page 1210 providing the director with tourist names, type of tourist, images related to the tourist, the option to spot tourists on a map, and communication options such as calling or messaging the tourist. Referring to FIG. 14, the director 20 may also be provided with a general search option permitting the searching of information within the network. Further, the director may be provided the option to delete specific tourists from the list. Any information may be exported by the director into a .pdf or similar file type.

Figure 15:
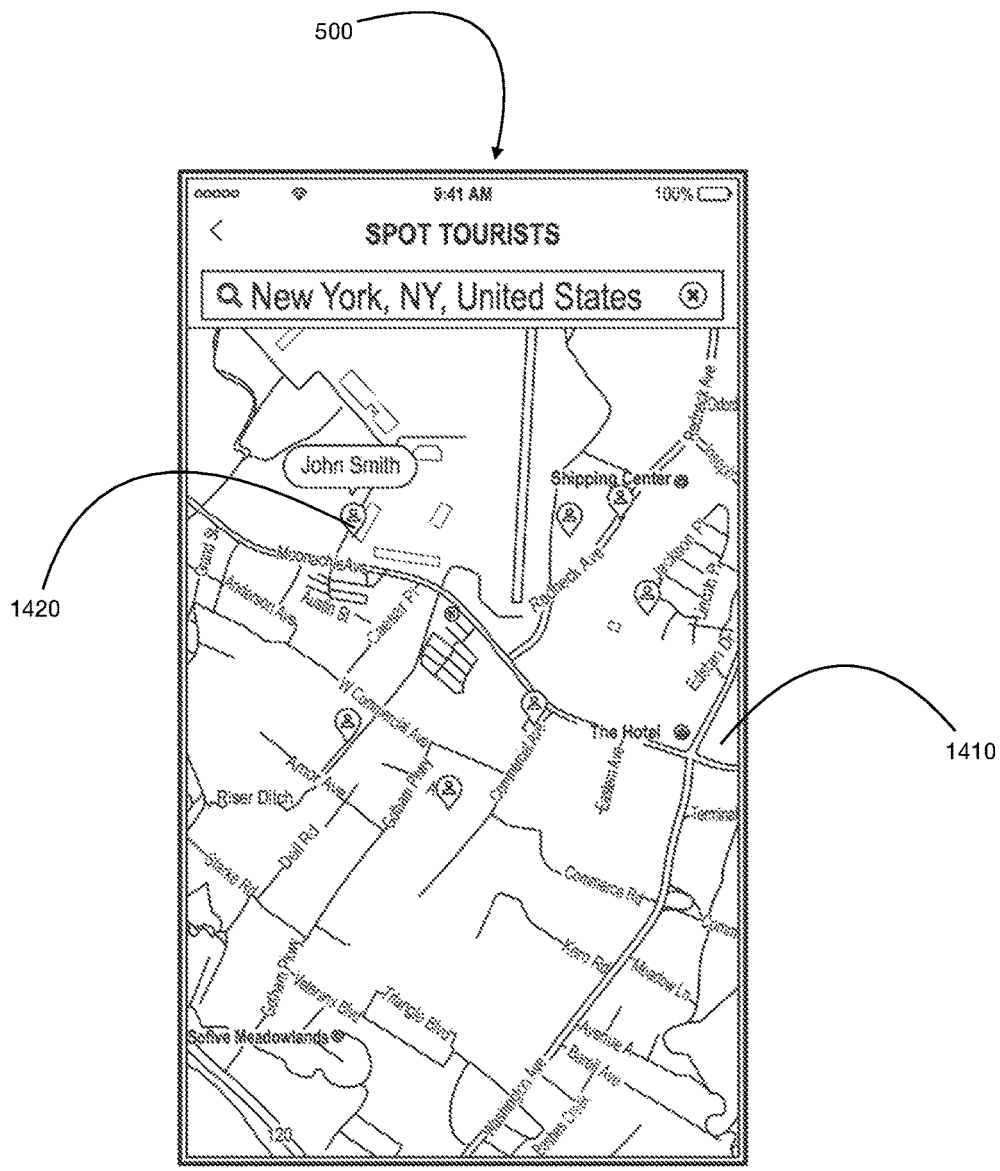
FIG. 15 illustrates a schematic representation of a screenshot of a tourist tracking system from the perspective of the director, according to an embodiment of the present invention.

In reference to FIG. 15, during an excursion the director is able to track movement and location of the tourists utilizing a GPS system. In a preferred embodiment, when a tourist is inside the vehicle, or at a predetermined distance therefrom, the director is provided with an identifying icon noting the tourists is within the predetermined radius (or inside the vehicle). This feature allows the director to rapidly determine users who are in a particular location, and notify those who are outside of the vehicle during the excursion. Preferentially, a colored icon 1220 alerts the director specific tourists within the predetermined radius. The director may have the option to view a map having icons denoting the specific locations of tourists on the map. A contact icon 1230 may also be provided to permit the director 20 to contact the tourist 10.

Figure 16:
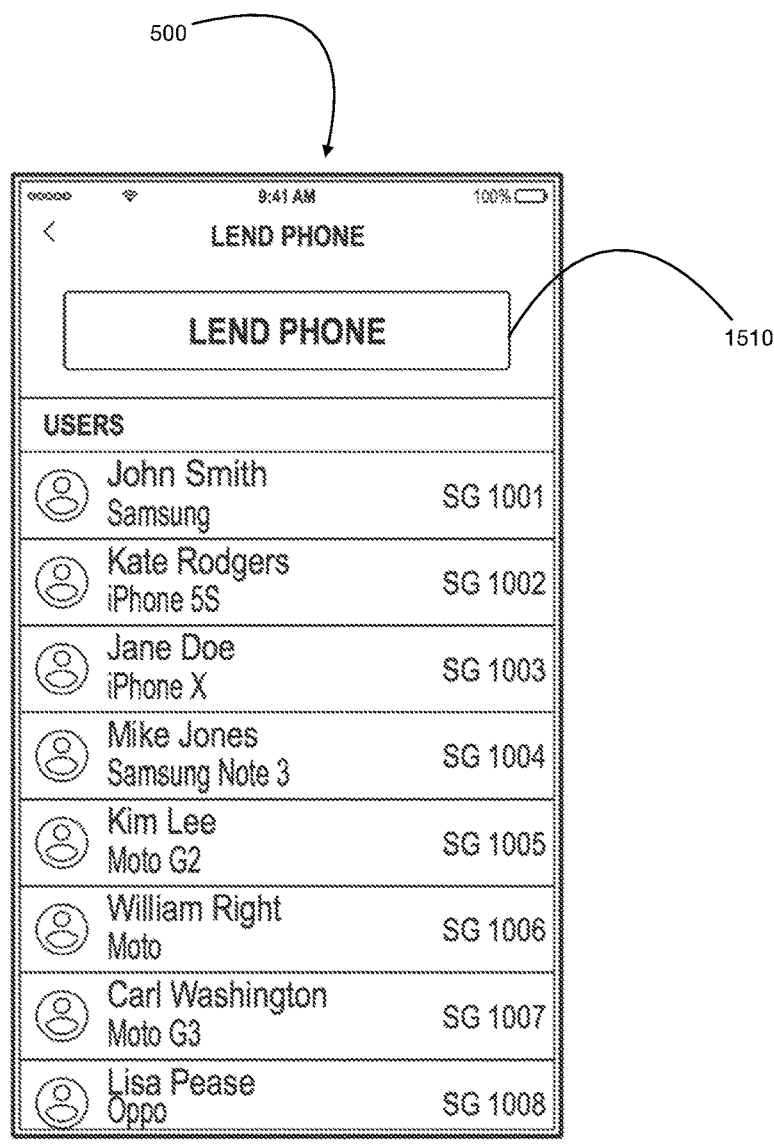
FIG. 16 illustrates a schematic representation of a screenshot of a tourist tracking system from the perspective of the director, according to an embodiment of the present invention.
Figure 17:
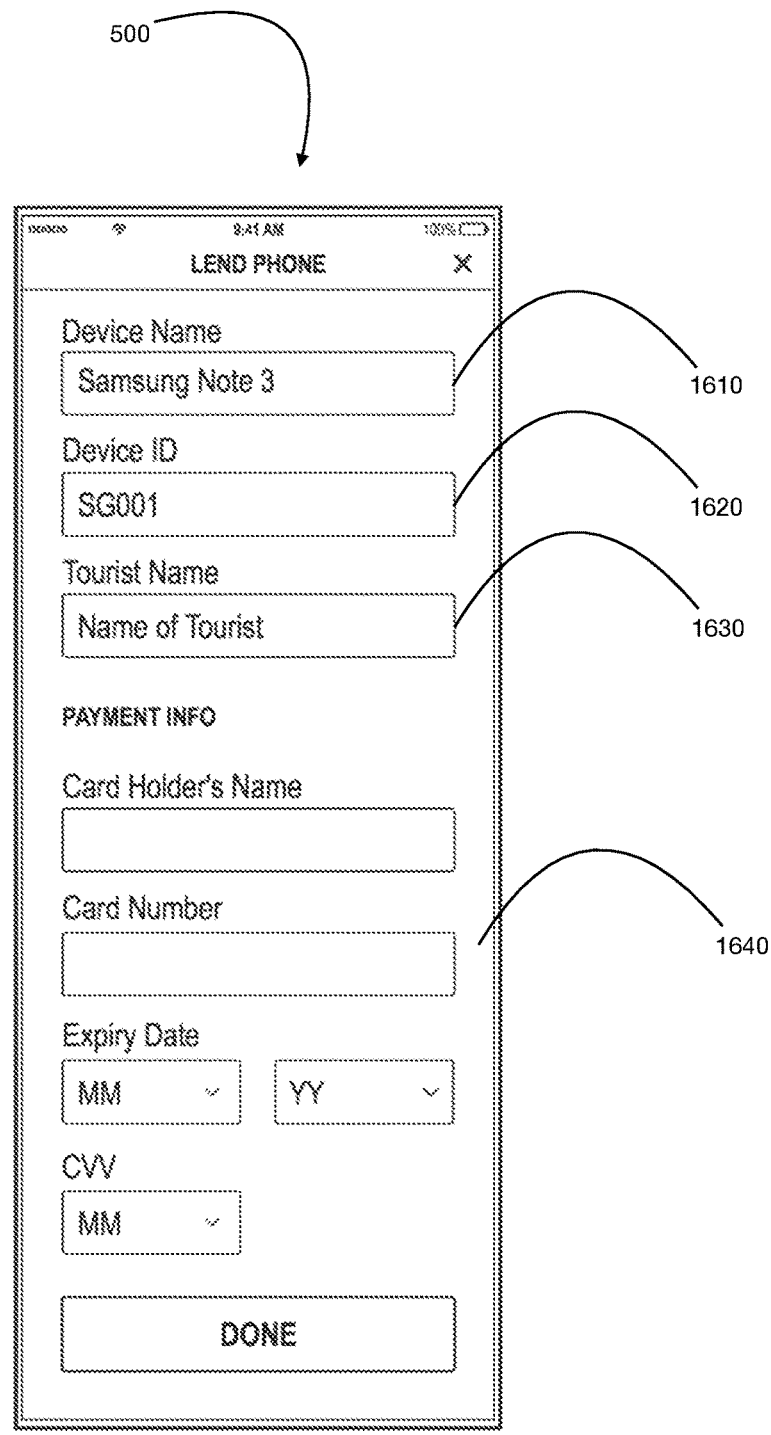
FIG. 17 illustrates a schematic representation of a screenshot of a tourist tracking system from the perspective of the director, according to an embodiment of the present invention.
Figure 18:
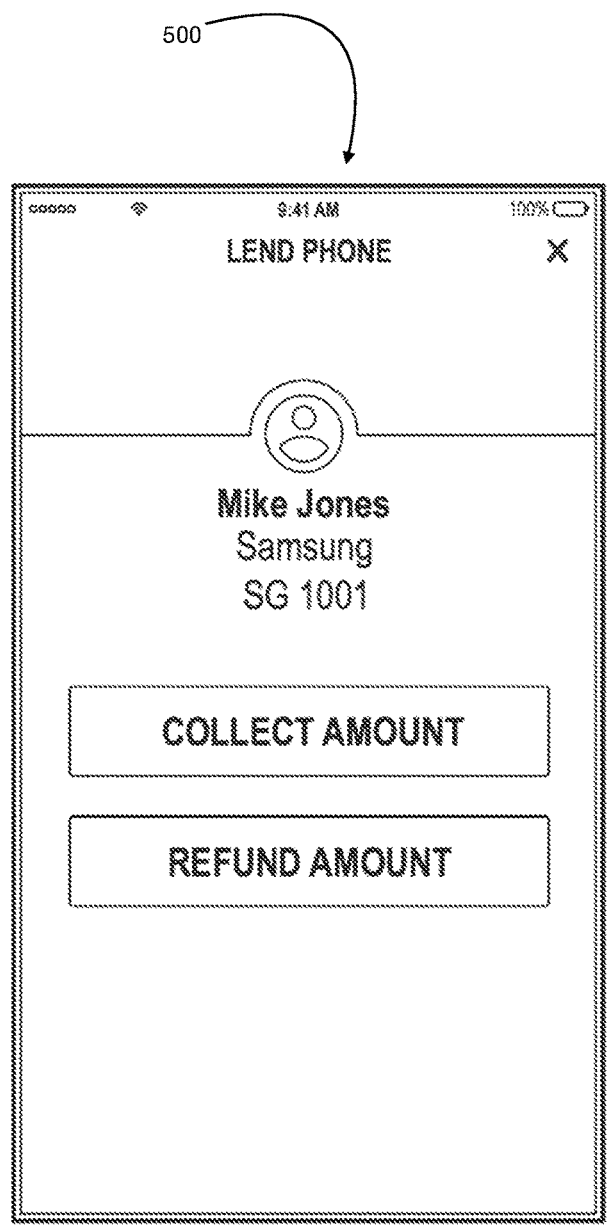
FIG. 18 illustrates a schematic representation of a screenshot of a tourist tracking system from the perspective of the director, according to an embodiment of the present invention.
Figure 19:
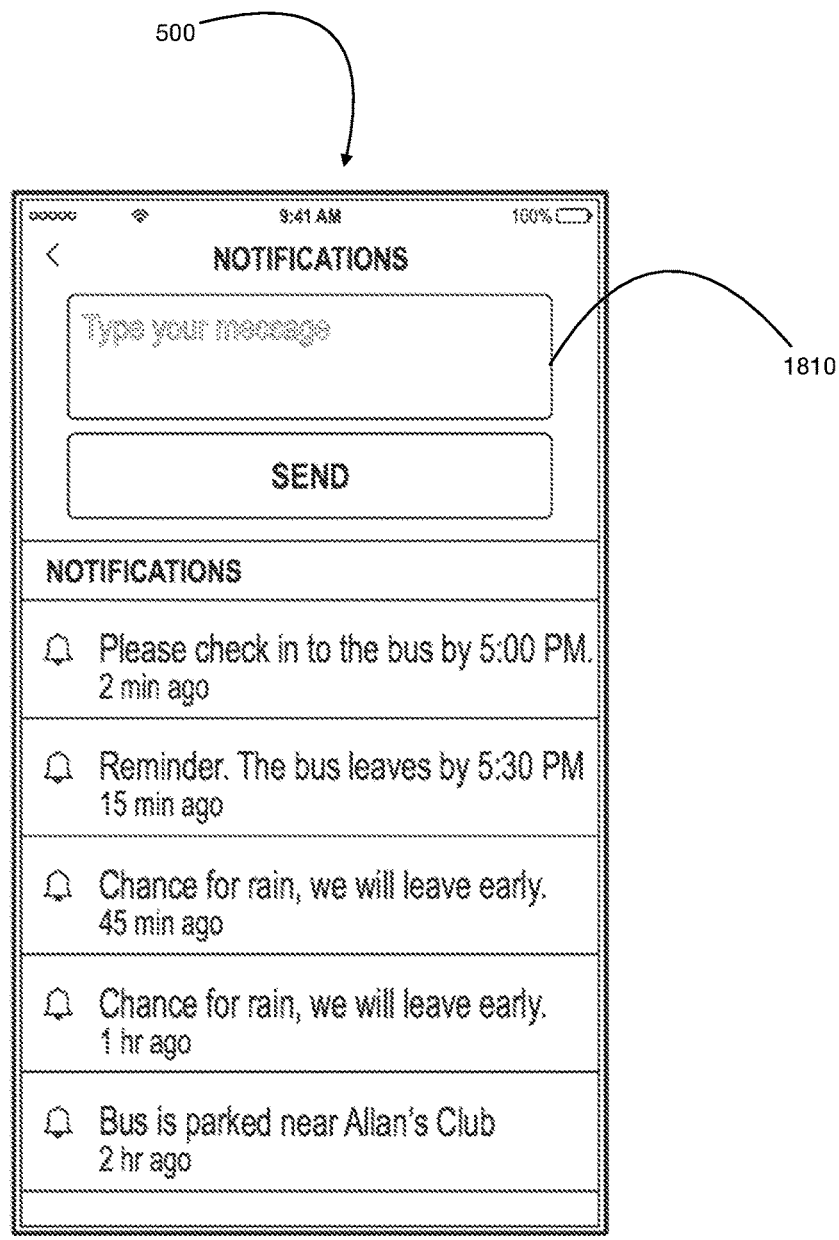
FIG. 19 illustrates a schematic representation of a screenshot of a tourist tracking system from the perspective of the director, according to an embodiment of the present invention.

For the application to work effectively, each tourist 10 must have a means of network connectivity as well as a GPS implement on their device. FIGS. 16-18 illustrate the GUI 500 giving directors 20 the option to lend a PED for the tourist to utilize during the excursion. In the instance that a tourist 10 does not have a PED on their person, the director may select the "Lend Phone" 1510 feature providing the director with a series of options. The "Lend Phone" screen has the options for the director to select the name of the tourist who will receive the lended PED and input the identifiers 1610, 1620, and 1630 associated with the PED that will be lent to the tourist 10. Further, an option is given for the director to charge a fee for using the PED provided by the director. Payment information 1640 may be collected if this option is selected. The director 20 may also be provided with the option to refund fees (see FIG. 18). Payment processing intermediaries including Stripe, or similar services may be utilized to process payments.

In reference to FIG. 15, the "Spot Tourist" feature prompts the director to view a map 1410 having icons indicating tourist locations. The director may select icons 1420 for any tourist who appears on the map and elect to contact the selected tourist. This allows the director to send directions or other information to any tourist whom is selectable on the "Spot Tourist" map.

Notifications may sent to any number of tourists alerting the tourists of a variety of information. This may be utilized to send directions, excursion information, guidelines, warnings, and other general instructions. As the director selects the notification tab, the director may enter a message in a text box 1810. When the message is complete, a send tab may be selected to send the message input in the text box 1810.

In an embodiment, the director 20 may view a public profile 1910 related to a specific tourist. The tourist profile 1910 may include user identifiers including name, images, emails, phone numbers, and special needs required by the tourist.

Once an excursion is complete, the director may select icon "complete excursion". Selecting the "complete excursion" icon requires the director 20 to input excursion start and end dates, name of the completed excursion, and vehicle details. Once marked as complete, the excursion is listed in the excursion history of the specific director.

Tourist Tracker for Tourists

Figure 21:
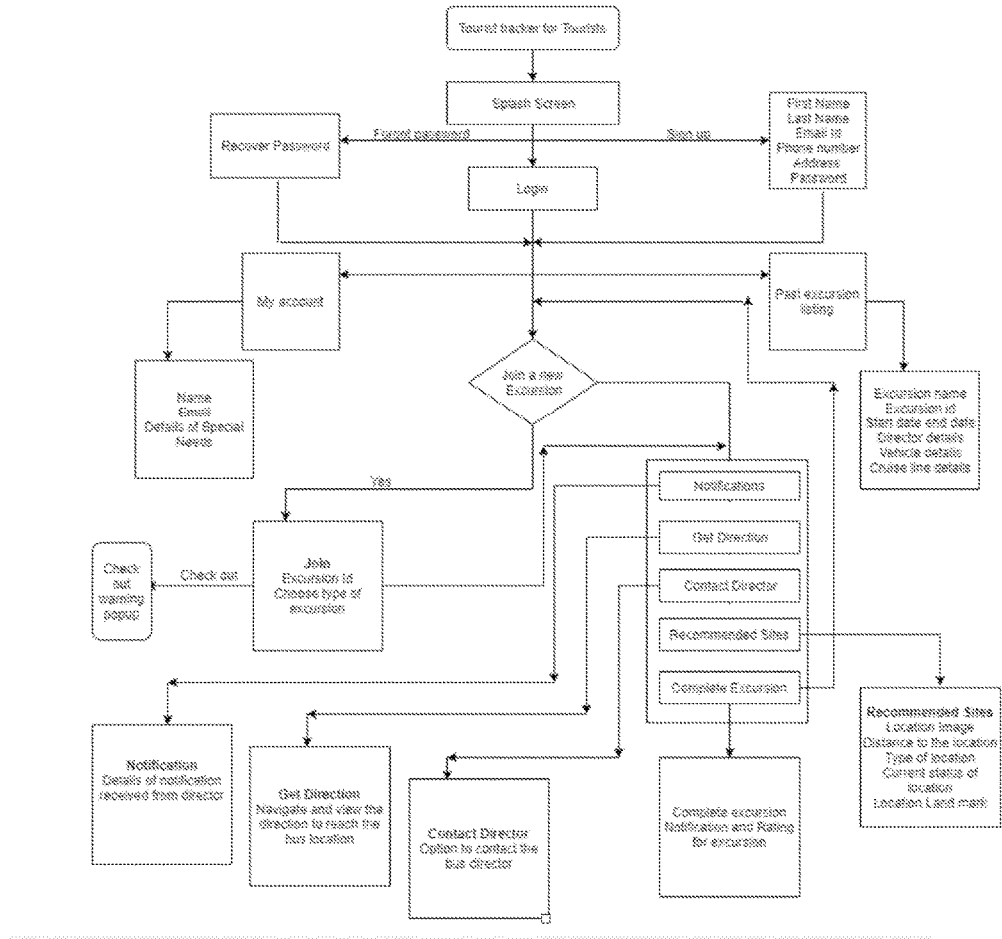
FIG. 21 is a flowchart of a tourist tracking system related to the tourist, according to an embodiment of the present invention.

A flow chart is illustrated in FIG. 21 relating to a user-implemented process for users who identify as a tourist within the system. In step 9 the tourist 10 registers an account followed by sending and receiving information in step 10. In step 11, the tourist 10 receives directions generated by the director 20. FIGS. 23-26 illustrate embodiments of login screens, and account recovery screens by the tourist associated GUI 2100. Once the tourist has downloaded the application to their PED 115, the tourist is presented the splash screen followed by either a sign up screen, login screen, or the option to recover a forgotten password. When the tourist has successfully logged in using verified credentials, the user is directed to a home page 2520 having a plurality of selectable options including a "My Account" 2530, "Join New Excursion"2500, and "Past Excursions" 2510. Selecting "My Account" provides the user with account data input during the account creation process. Past excursion listings may be viewed as well as details thereof are provided.

Figure 27:
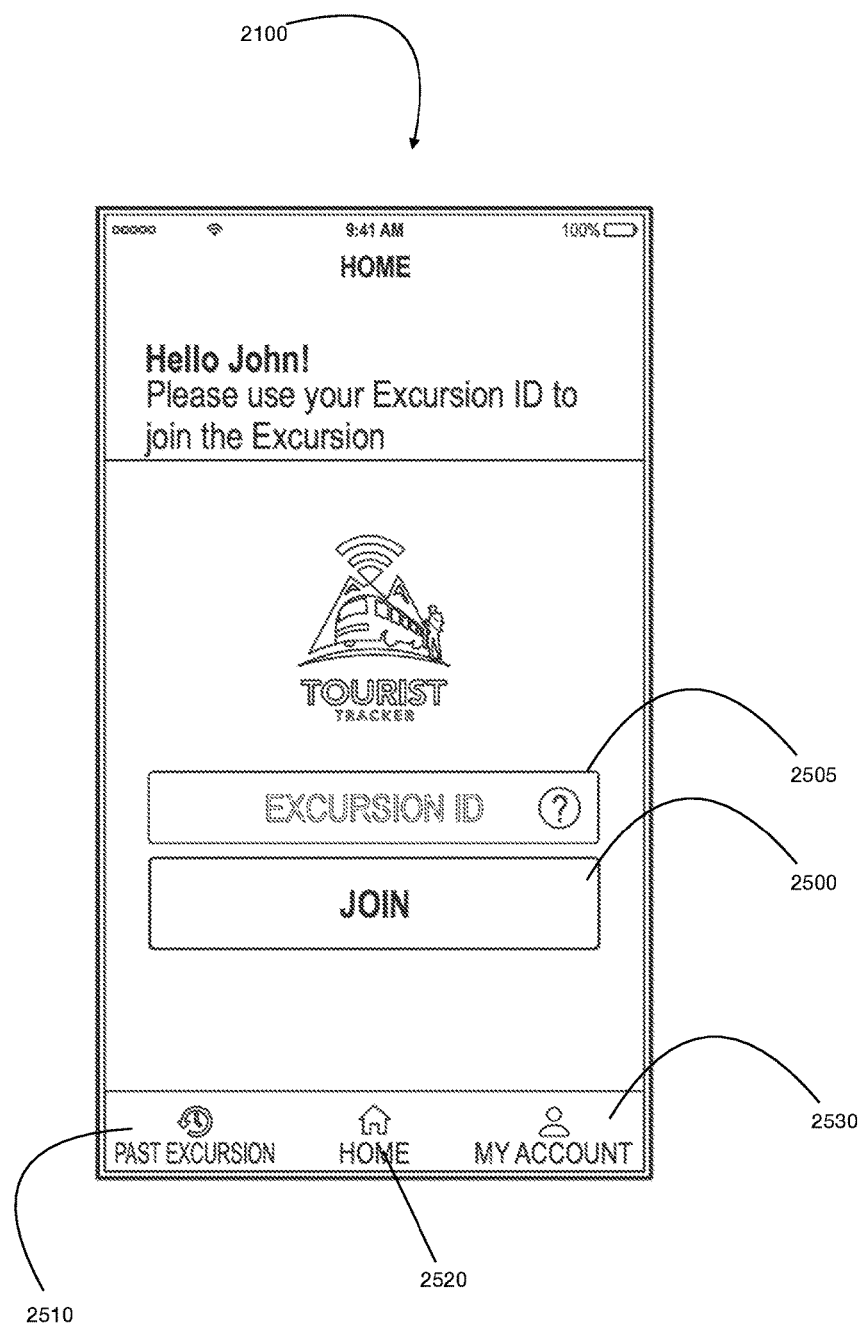
FIG. 27 illustrates a schematic representation of a screenshot of a tourist tracking system from the perspective of the tourist, according to an embodiment of the present invention.
Figure 28:
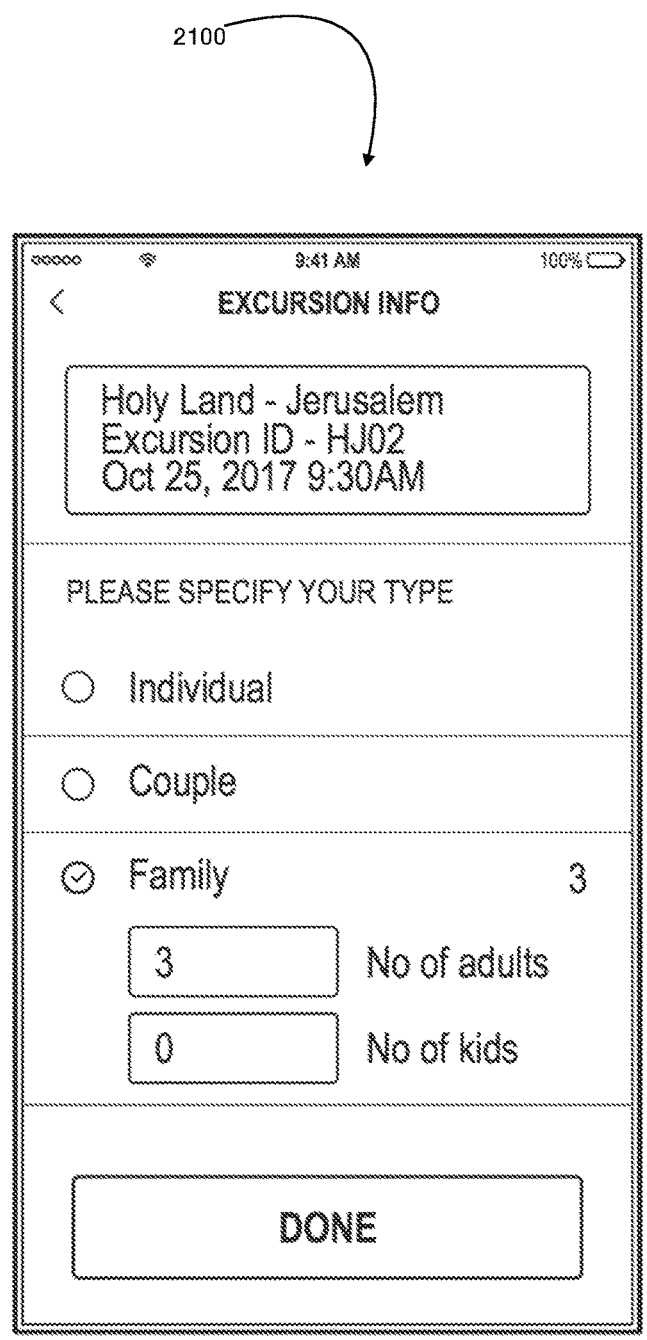
FIG. 28 illustrates a schematic representation of a screenshot of a tourist tracking system from the perspective of the tourist, according to an embodiment of the present invention.

The tourist may select the "Join New Excursion" 2500 option which permits the tourist to engage in an upcoming or ongoing excursion. Steps taken to join an excursion are further exemplified in FIGS. 27-28. Once an excursion has been joined, the tourist may receive notifications, directions, contact the director, view recommendations, and complete an excursion.

A new user 10 will first download the application to their PED and sign up using credentials known in the arts. This may include names, email address, phone number, password, profile images, and the option to input special needs required during the excursions. Credentials may be changed or recovered as described above and known in the arts.

Once an excursion has been joined, the tourist may receive notifications, directions—both to the bus and/or to the director—as well as the option to contact the director. Recommendations may be viewed as provided by the network. Further, the tourist may have access to the camera feature 2750 if enabled in preferences. A gallery of images 3103 may be stored which are viewable by the user. Pre-specified photos may be specific to the instant excursion as well as current weather conditions for the entire route of the excursion.

Figure 22:
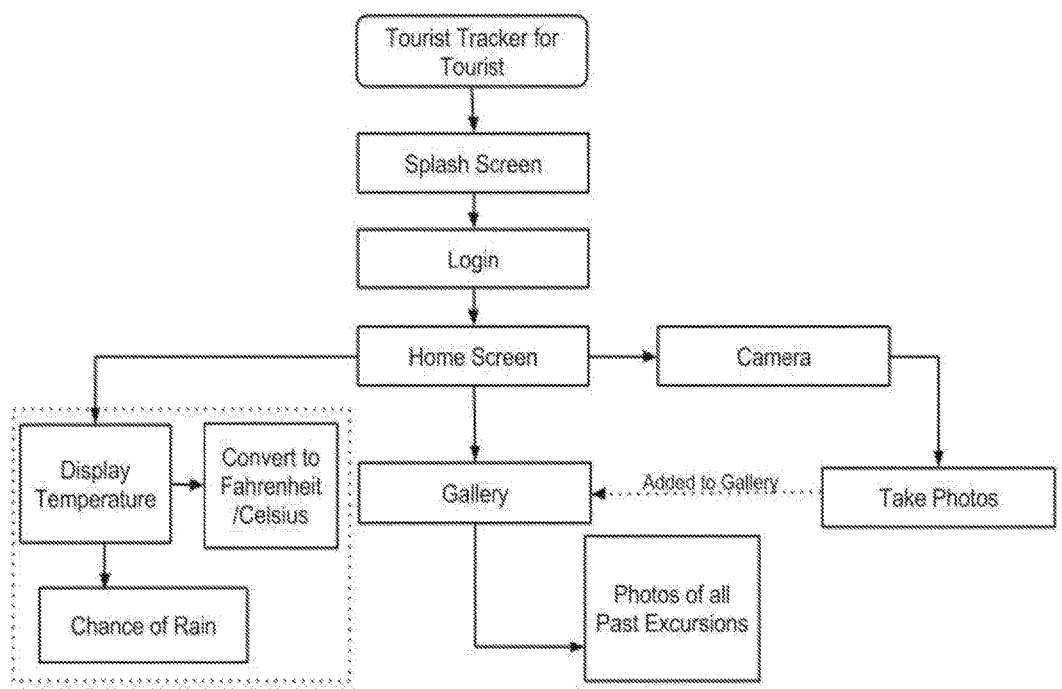
FIG. 22 is a flowchart of a tourist tracking system related to the tourist specifically showing a process for the weather module, gallery module, and camera module, according to an embodiment of the present invention.
Figure 23:
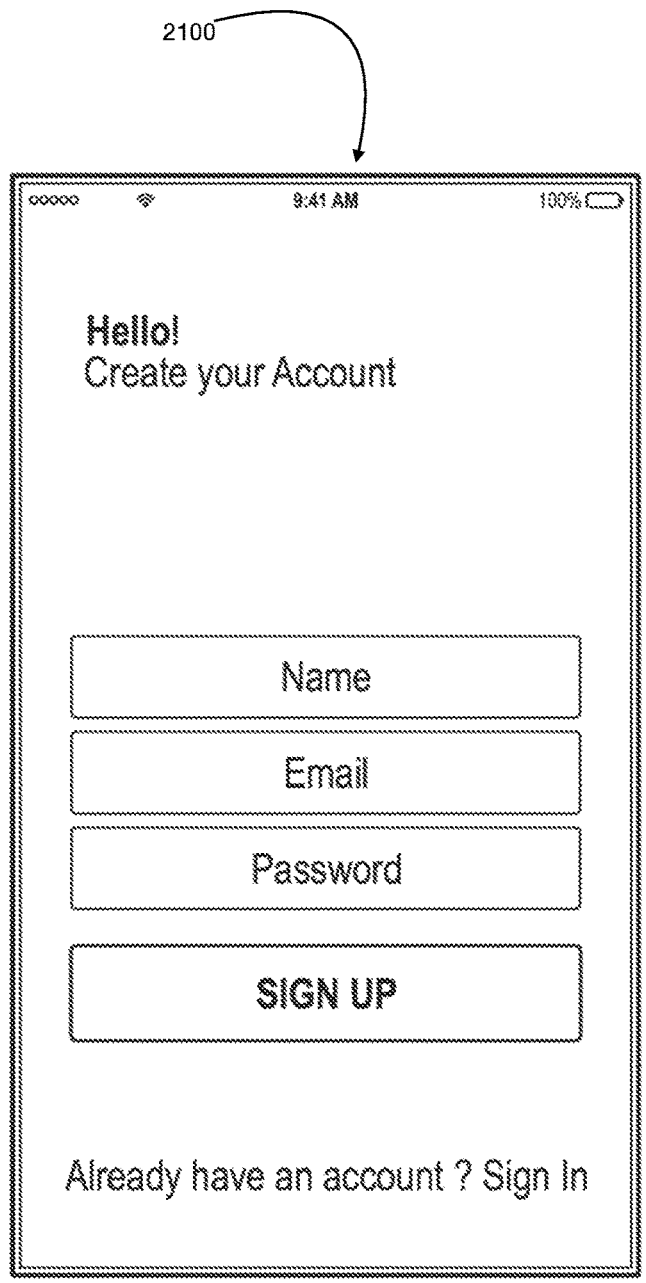
FIG. 23 illustrates a schematic representation of a screenshot of a tourist tracking system from the perspective of the director, according to an embodiment of the present invention.
Figure 24:
FIG. 24 illustrates a schematic representation of a screenshot of a tourist tracking system from the perspective of the tourist, according to an embodiment of the present invention.
Figure 25:
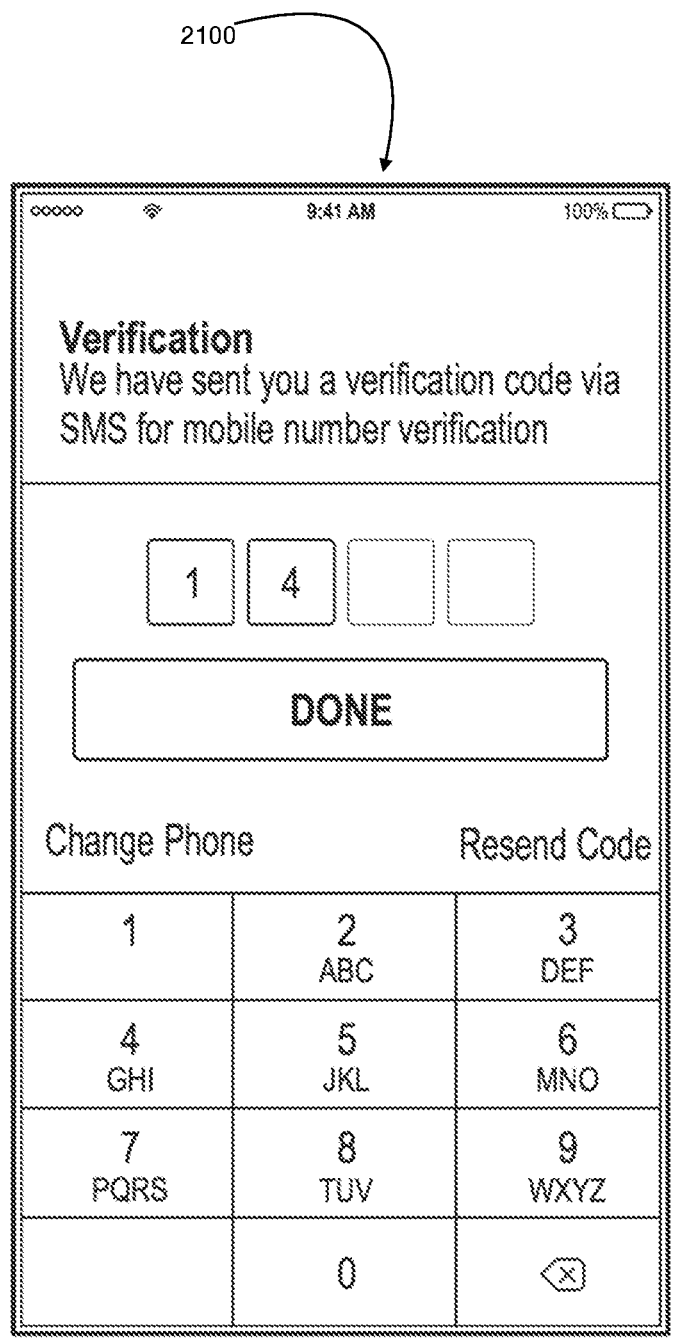
FIG. 25 illustrates a schematic representation of a screenshot of a tourist tracking system from the perspective of the tourist, according to an embodiment of the present invention.
Figure 26:
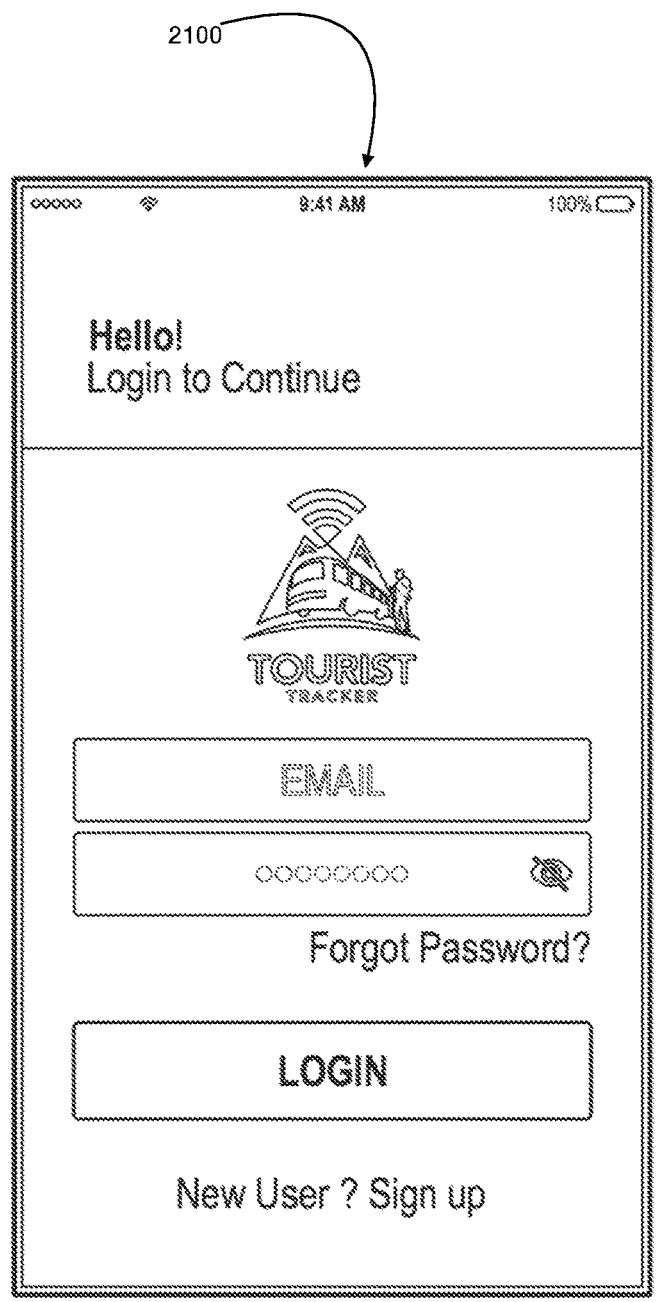
FIG. 26 illustrates a schematic representation of a screenshot of a tourist tracking system from the perspective of the tourist, according to an embodiment of the present invention.

FIG. 22 illustrates a flowchart for the weather display 2901, camera 2750, and gallery modules 3101. While one skilled in the art may appreciate that a plurality of weather metrics 2901 may be displayed, the instant embodiment will display the temperature as either Fahrenheit or Celsius as determined by user preference. Further, the GUI 200 may display sunny, cloudy, rainy, as well as other conditions as a weather icon 2901 on a plurality of screens throughout the tourist interface (see FIG. 29).

Figure 30:
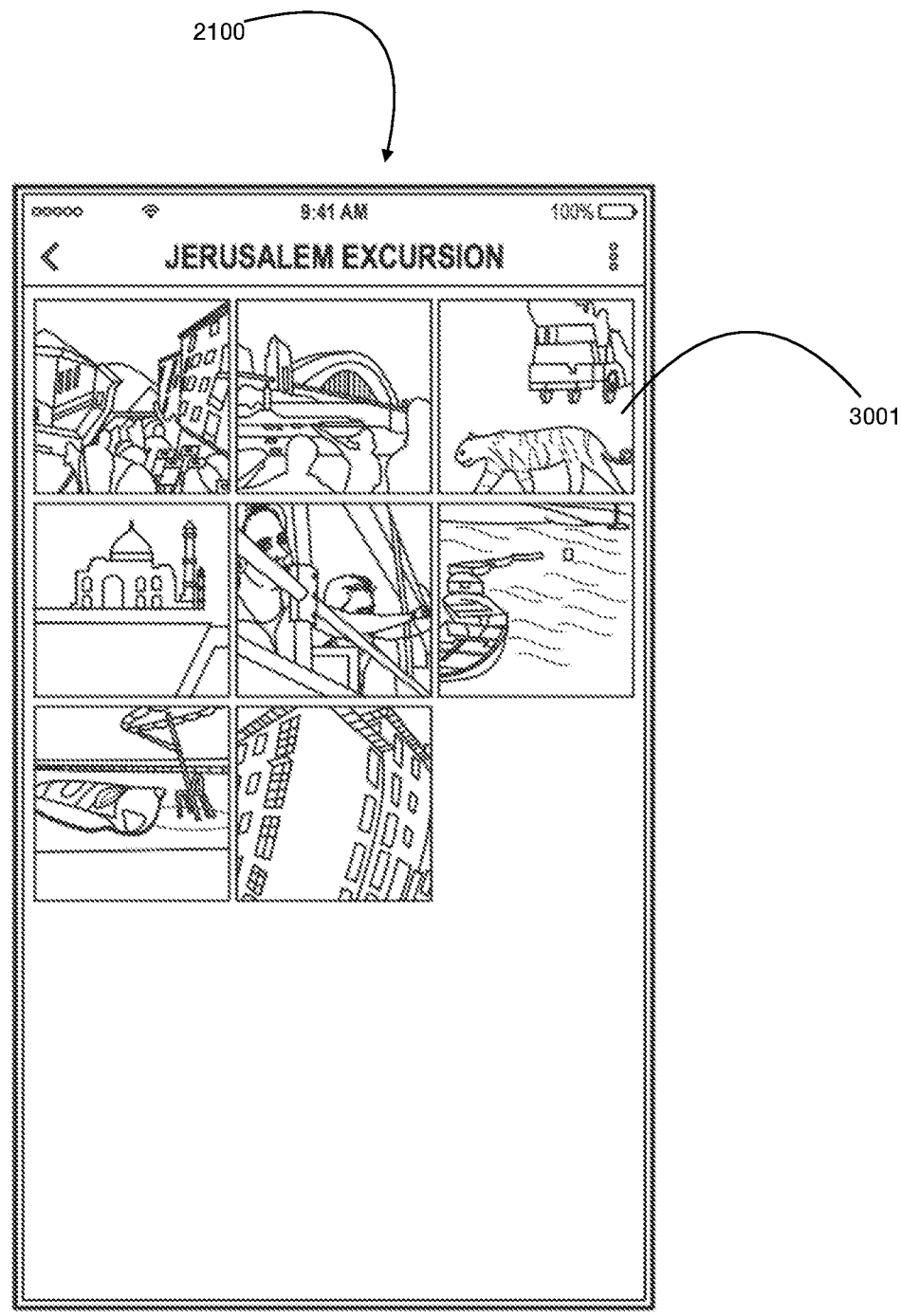
FIG. 30 illustrates a schematic representation of a screenshot of a tourist tracking system from the perspective of the tourist, according to an embodiment of the present invention.
Figure 31:
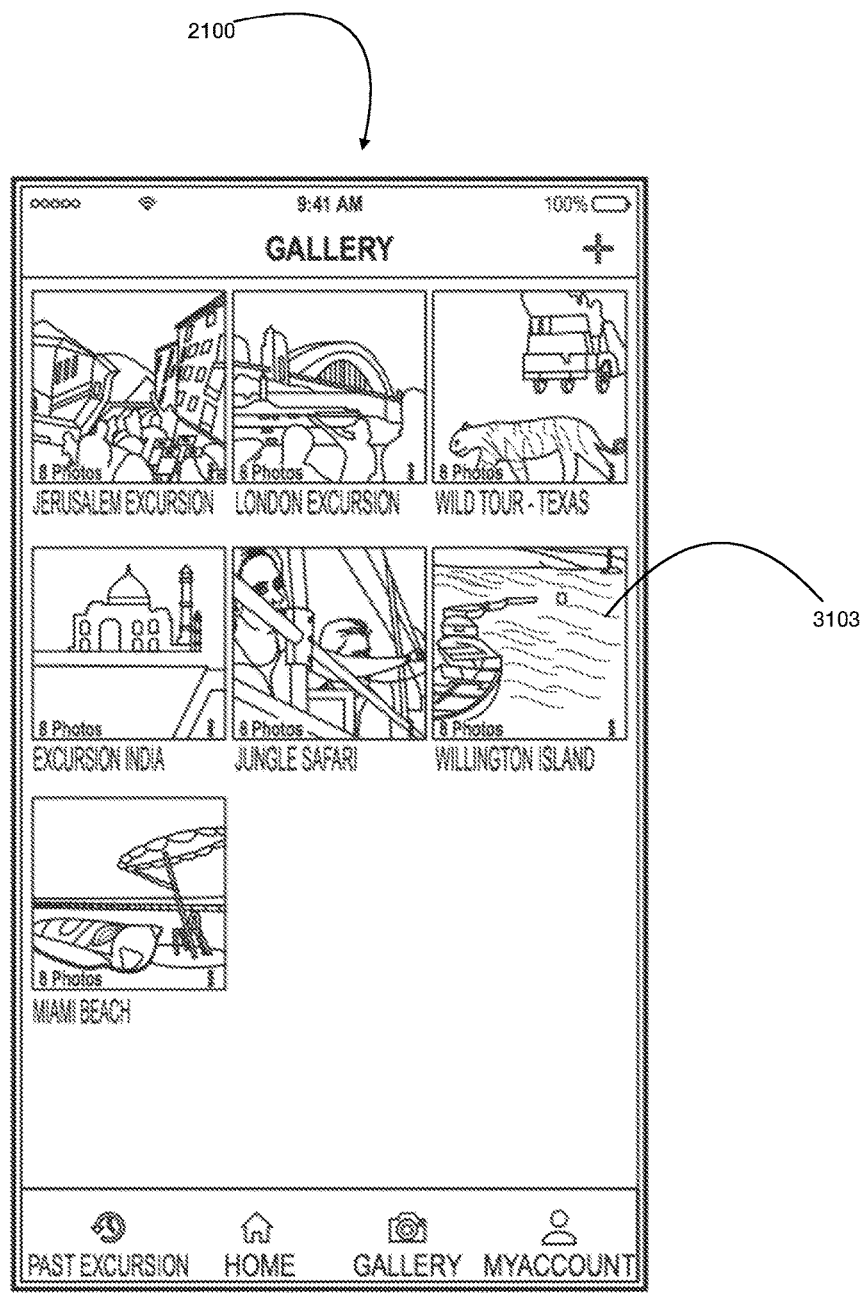
FIG. 31 illustrates a schematic representation of a screenshot of a tourist tracking system from the perspective of the tourist, according to an embodiment of the present invention.

The camera 2750 feature may be accessed within the GUI 200 permitting the user to take any number of photos along the excursion. Once an image has been captured by the camera, the user may elect to add the image to the gallery specific to the excursion. The tourist is able to access the gallery of images including images of past excursions as seen in FIGS. 30-31.

An existing or newly credentialed user may sign in using their specific credentials prompting the user to a home page allowing the user to enter an excursion ID 2505 and join 2500 an excursion. Once an acceptable excursion ID 2505 is selected and validated, a plurality of input fields are displayed. The tourist may select to enter the excursion as an individual, or as part of a couple or group. In the event that the tourist is part of a group, the tourists is prompted to input the group size which may be further denominated into number of adults and children who comprise the group. Further, the tourist may select or be provided with excursion dates and times, excursion names, excursions ID's, among other information known in the arts.

Figure 32:
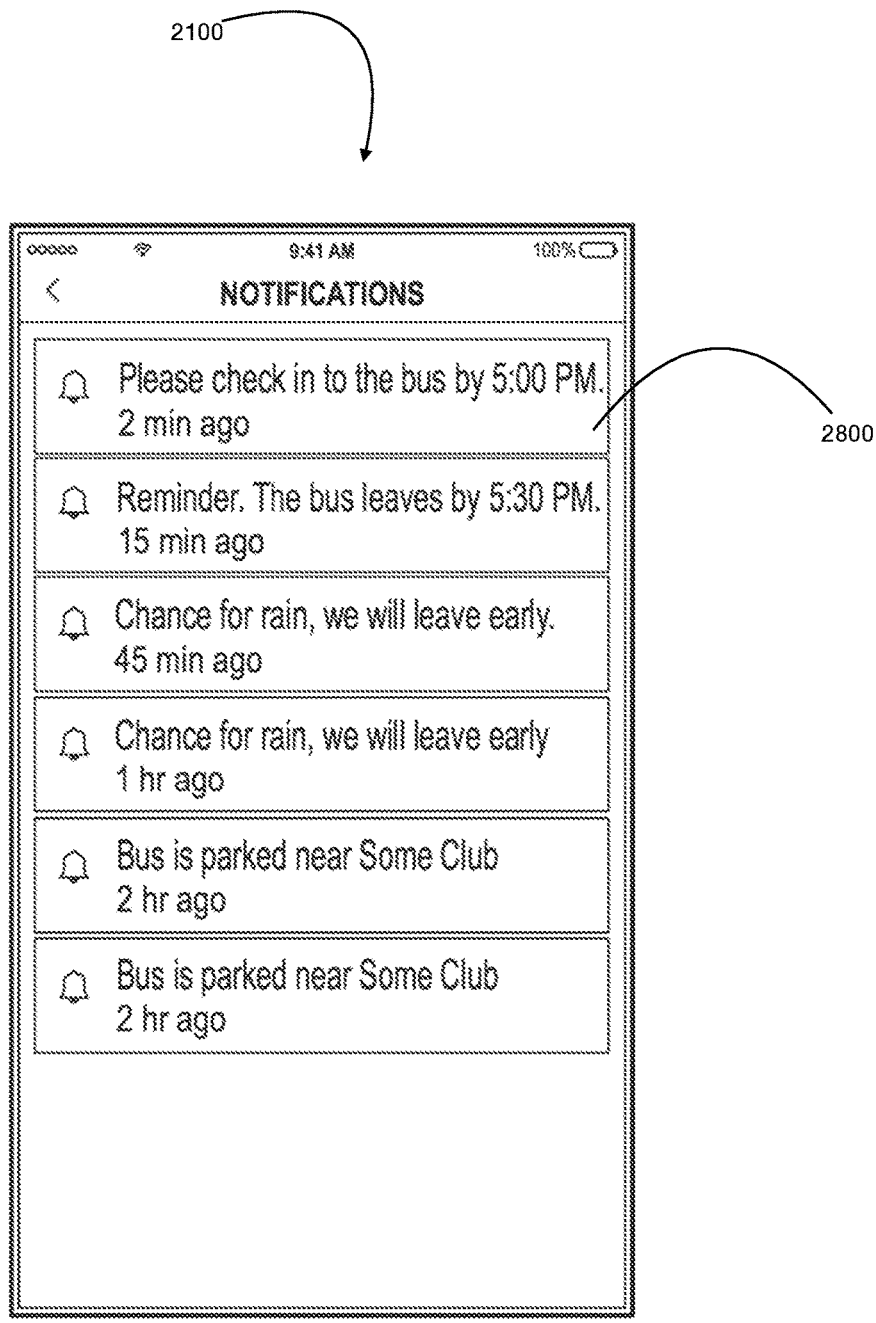
FIG. 32 illustrates a schematic representation of a screenshot of a tourist tracking system from the perspective of the tourist, according to an embodiment of the present invention.

Once a tourist has successfully joined an excursion the user is able to directly access the homepage 2700 associated with the excursion. Information may be provided relating to; receive notifications 2710, directions 2720, contact director 2730, view recommendations 2740, past excursion details, tourist profile, and past excursion details including name, vehicle identifiers, and check in times. Further, the user may choose to change/add contact or locate other users. The user may also select to take a photo utilizing the camera feature, view excursion galleries In reference to FIG. 32, the notification detail page 2800 may provide a list of notifications sent by the system administrator 40, director 20, or automated notifications by the system.

The tourist may elect to receive directions to the vehicle, or other specific locations associated with the excursion. GPS systems 115 in communication with the tourist PED 110 communicated with the GPS system 135 associated with the vehicle device to accurately direct the tourist to the vehicle 30. The GPS protocols used by the system may include any well known protocols in the arts of mapping and GPS guided directions commonly implemented in mobile or static devices.

Figure 33:
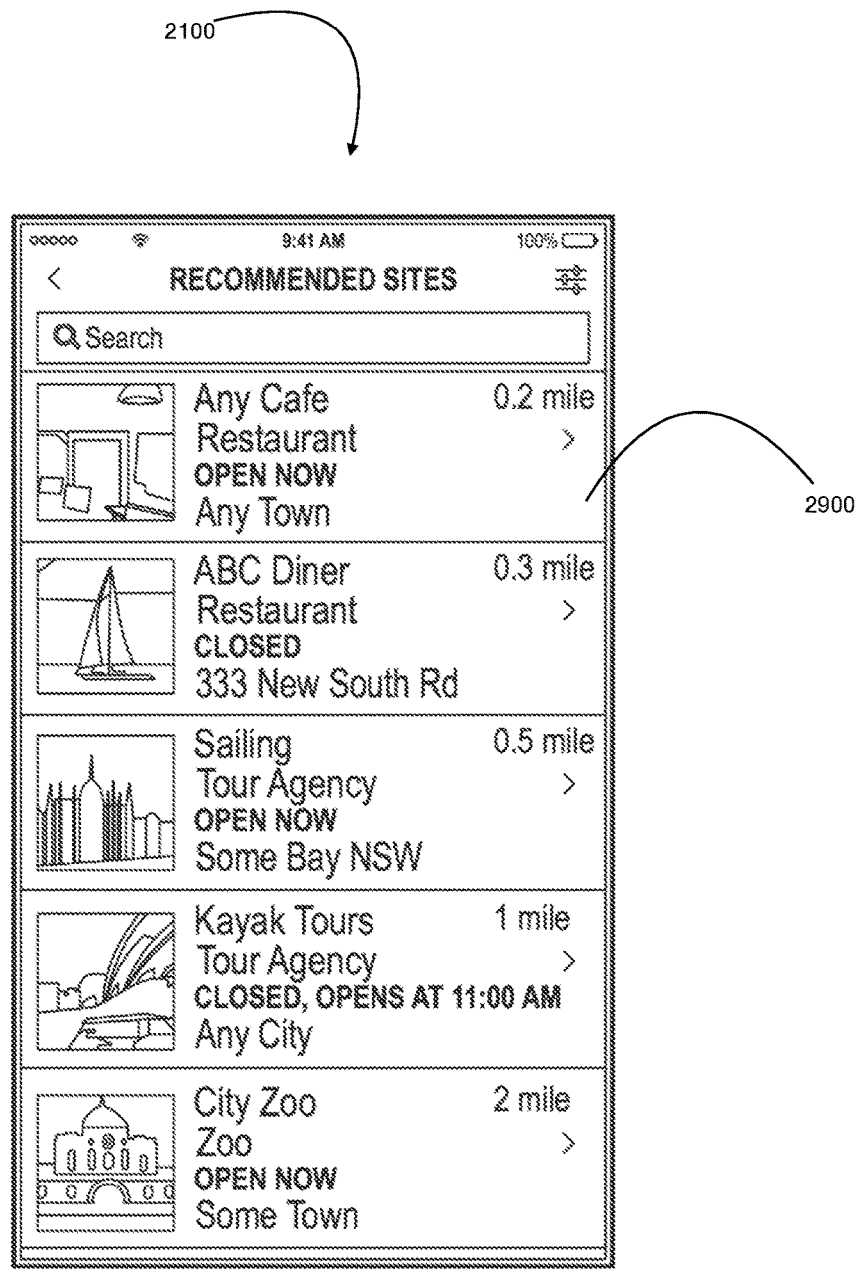
FIG. 33 illustrates a schematic representation of a screenshot of a tourist tracking system from the perspective of the tourist, according to an embodiment of the present invention.
Figure 34:
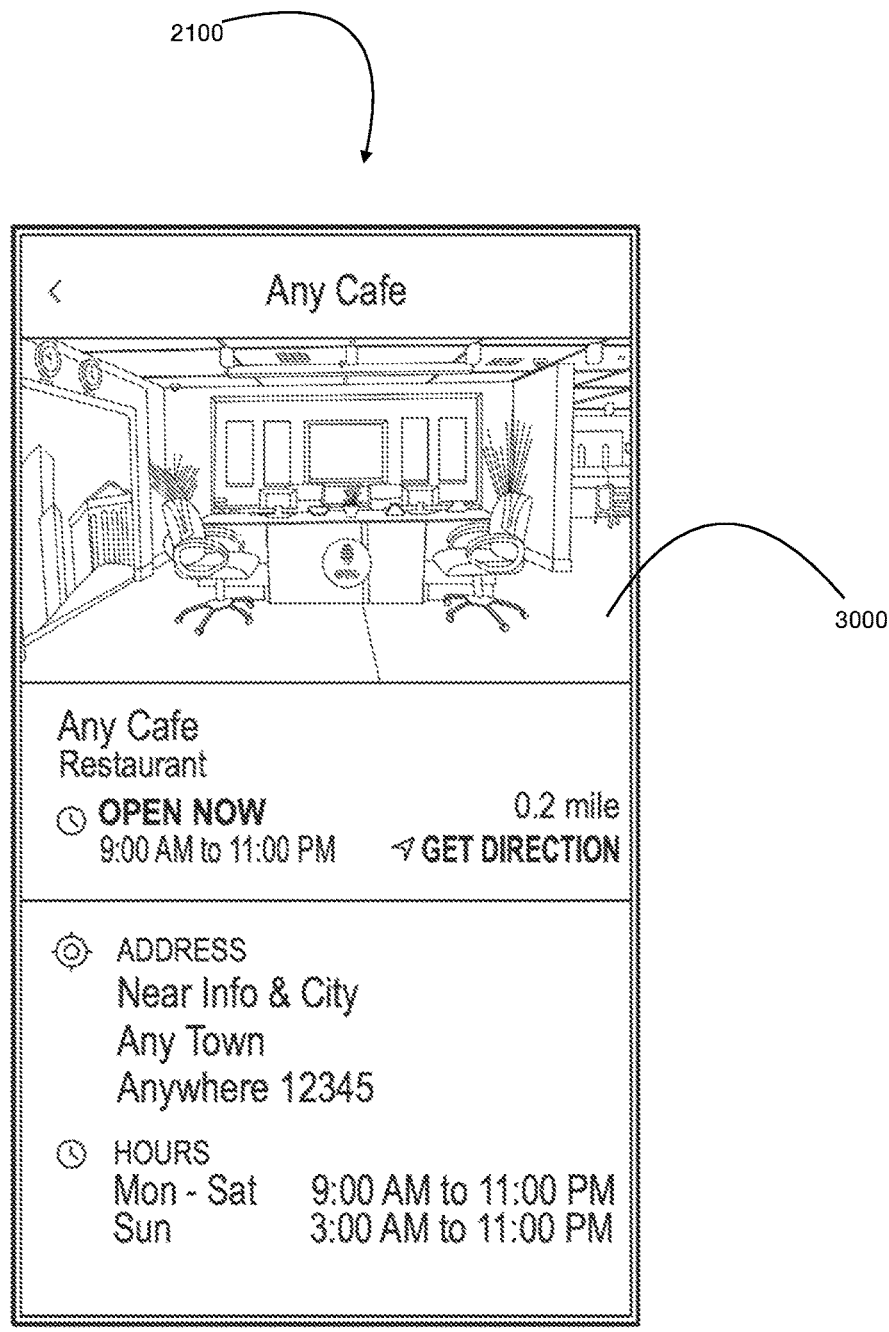
FIG. 34 illustrates a schematic representation of a screenshot of a tourist tracking system from the perspective of the tourist, according to an embodiment of the present invention.

The system may provide the user with a list of recommended attractions 2900 along the excursion route. Recommended attractions 2900 may be provided by the director 20, or network 150 in communication with external tourist services (such as popular services similar to Yelp and Trip Advisor). In reference to FIG. 33, the user may select a specific recommended attraction page 3000 and view additional information including images, name and type of attraction, open and close times of the attraction, address, and navigations options.

Figure 35:
FIG. 35 illustrates a schematic representation of a screenshot of a tourist tracking system from the perspective of the tourist, according to an embodiment of the present invention.
Figure 36:
FIG. 36 illustrates a schematic representation of a screenshot of a tourist tracking system from the perspective of the tourist, according to an embodiment of the present invention.

A tourist profile may include a list of previous excursions (excursion history) and details thereof as described above. The tourist account feature (see FIGS. 35-36) contains information provided by the tourist upon the creation of login credentials, as well as images, language settings, the option to edit profile and settings thereof, as well as the option to leave an excursion.

Figure 38:
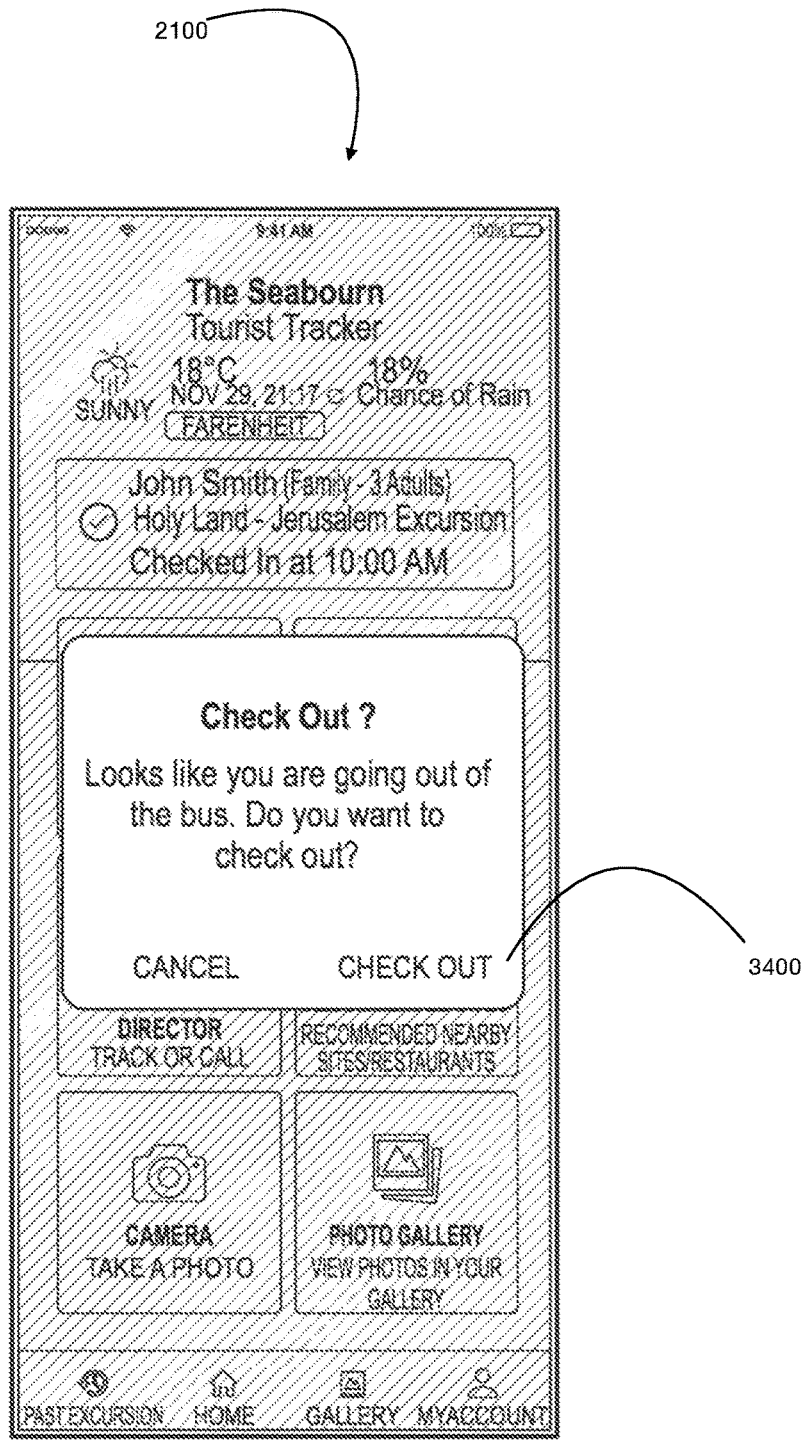
FIG. 38 illustrates a schematic representation of a screenshot of a tourist tracking system from the perspective of the tourist, according to an embodiment of the present invention.
Figure 39:
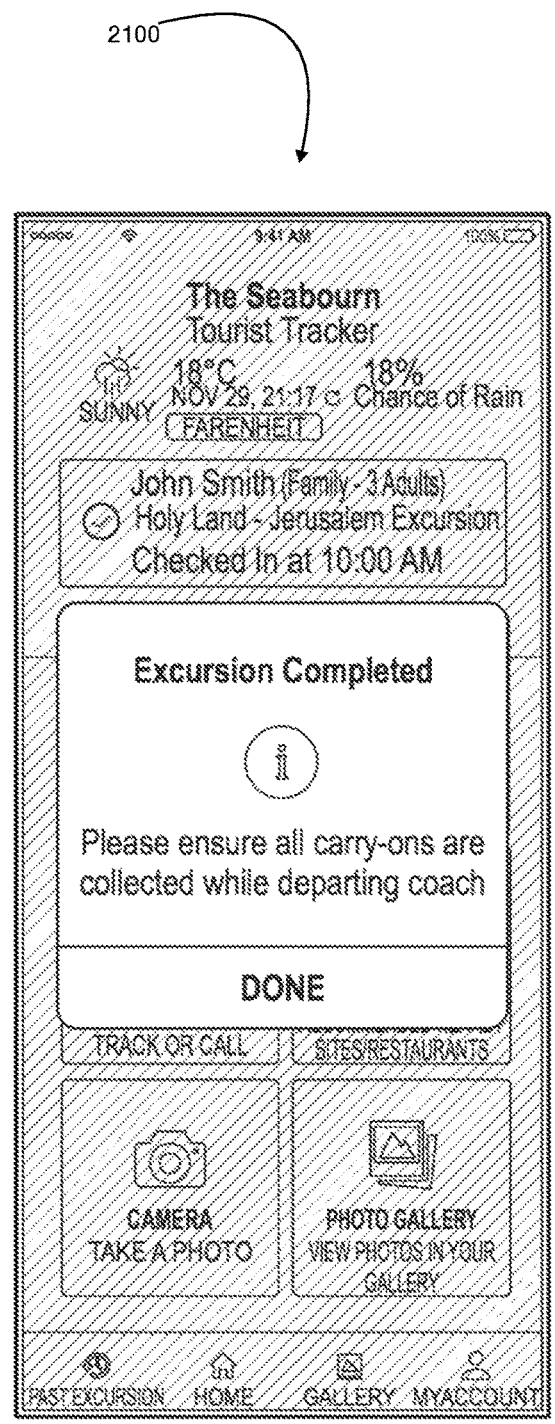
FIG. 39 illustrates a schematic representation of a screenshot of a tourist tracking system from the perspective of the tourist, according to an embodiment of the present invention.

In an embodiment and in reference to FIGS. 38 and 39, as the tourist leaves a predetermined radius (such as 30 meters) from the vehicle, the tourist is prompted to "check out" 3400 from the vehicle and excursion. Once the tourist is outside of the predetermined radius, a notification is transmitted to the tourist PED providing the selectable option to check out.

Figure 37:
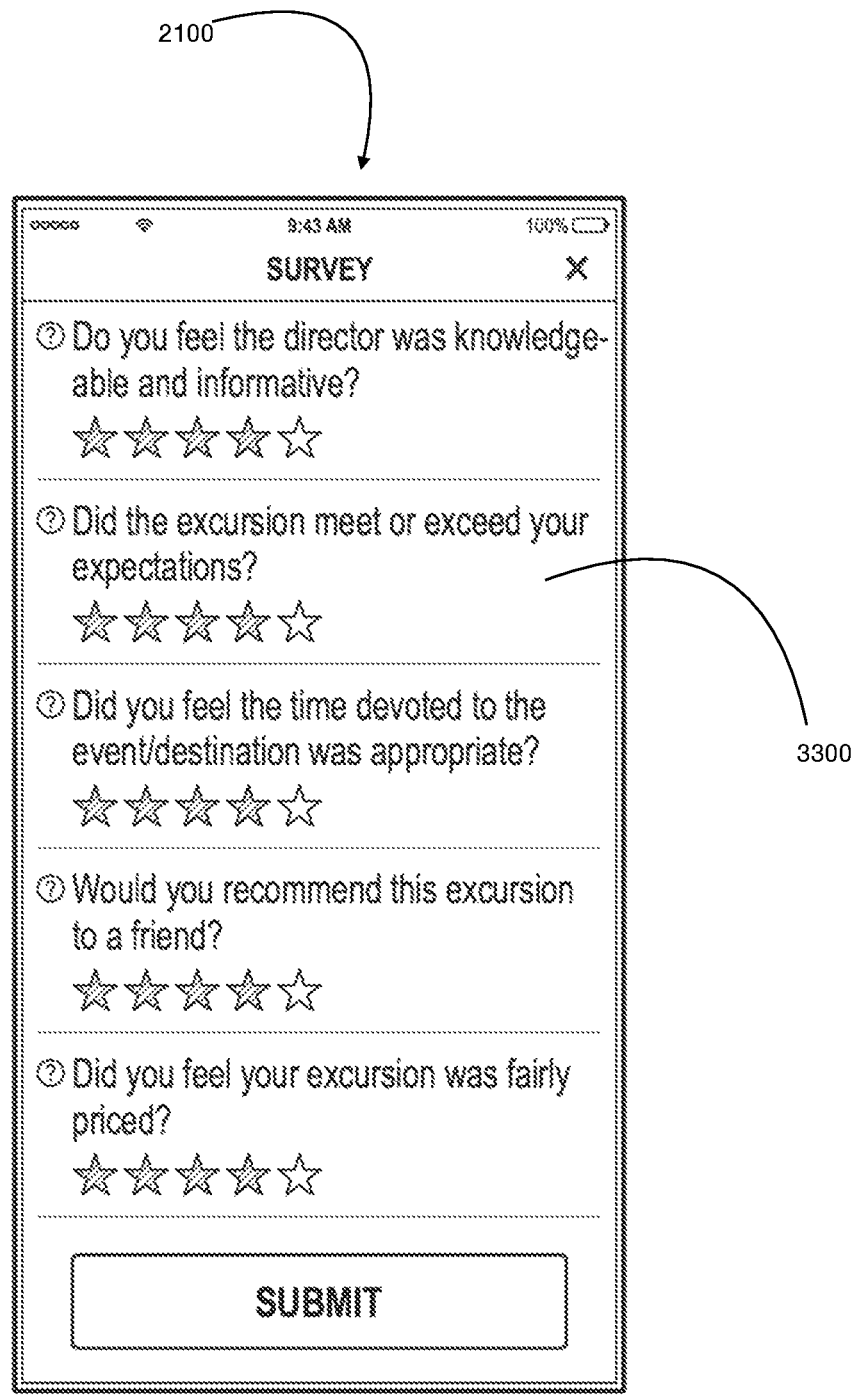
FIG. 37 illustrates a schematic representation of a screenshot of a tourist tracking system from the perspective of the tourist, according to an embodiment of the present invention.

In an embodiment and in reference to FIG. 37, the user may select a rating 3300 for the excursion as commonly known in the arts. For example, the tourist may select between 1 and 5 stars as well as inputting comments and suggestions.

Tourist Tracker Administrator

Figure 40:
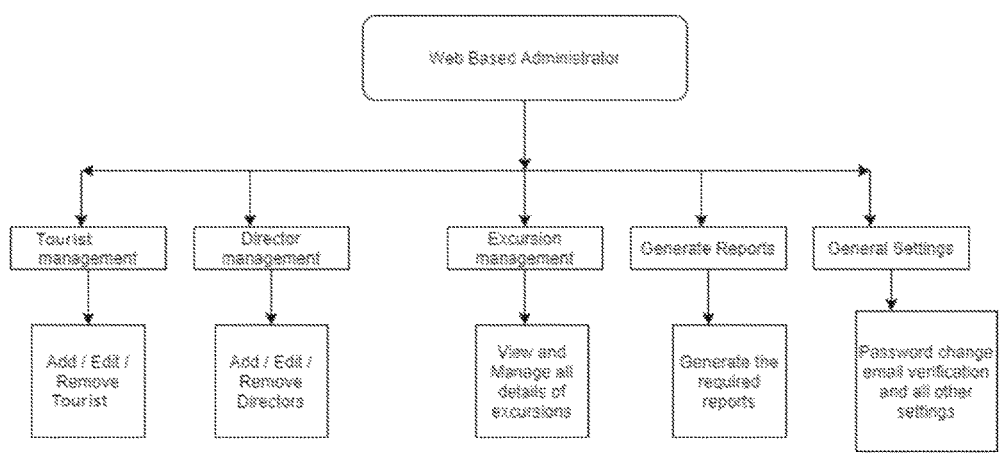
FIG. 40 illustrates a flow chart of a process related to the administrator, according to an embodiment of the present invention.

A flow chart illustrating a user-implemented process related to the web-based administrator shown in FIG. 40. The administrator may have the capacity within the network to manage tourists which may include the option to search, view, add, block, and approve tourists utilizing the system in any excursion. Further, the administrator has the option to manage directors which may include options to search, view, block, and approve directors utilizing the system. The administrator may also view excursion details and the status of each excursion. Reports may be generated by the administrator related to a plurality of parameters.

What is claimed is:

1. A tourist tracking system comprising;
   at least one vehicle having a vehicle-associated processor and an associated communications device, the vehicle-associated communications device having a GPS in communication thereto;
   at least one director having a director associated processor and an associated communications device, the director-associated communications device having a second GPS in communication thereto;
   at least one tourist having a tourist-associated processor and an associated communications device, the tourist-associated communications device having a third GPS in communication thereto;
   a network in communication with each of the at least one tourists, the at least one director, and the at least one vehicle, wherein the network is in communication with at least one database, wherein the vehicle-associated processor is adapted to communicate with the at least one storage device and a vehicle user interface to execute instructions to perform the following:
   registering the vehicle;
   enabling the vehicle-associated communications device to locate each of the at least one tourists;
   tracking the vehicle;
   wherein the director-associated processor is adapted to communicate with the at least one storage device and a director user interface to execute instructions to perform the following:
   creating an excursion;
   lending an electronic device to one or more tourists;
   locating each of the at least one tourists;
   sending and receiving notifications;
   generating directions utilizing at least one of the first, second, or third GPS systems;
   wherein the tourist-associated processor is adapted to communicate with the at least one storage device and a tourist user interface to execute instructions to perform the following:
   joining an excursion created by one of the at least one directors;
   sending and receiving notifications; and
   receiving directions generated by the GPS systems.

2. The system of claim 1, further comprising an administrator, wherein the administrator utilizes a computer configured to communicate with the network.

3. The system of claim 2, wherein the computer has a processor in communication with a user-interface operable to perform the following:
   managing tourists, directors, excursions, and vehicles;
   generating reports related to each of the tourists, directors, excursions, and vehicles; and
   modifying network settings.

4. The system of claim 1, further comprising at least one vehicle-associated user providing a plurality of vehicle credentials.

5. The system of claim 1, further comprising each of the at least one director providing a plurality of excursion credentials.

6. The system of claim 1, further comprising each of the at least one tourist providing a plurality of mandatory special requests.

7. The system of claim 1, further comprising a plurality of recommended attractions associated with the excursion, wherein each of the plurality of recommended attractions are within a predetermined distance from the excursion.

8. The system of claim 7, further comprising the step of sending directions, utilizing the tourist-associated processor and GPS system, to the tourist.

9. The system of claim 1, permitting each of the at least one directors to view each associated tourist on a map one the director-associated graphical user interface.

10. The system of claim 8, further comprising the step of transmitting each of the tourists locations to the network utilizing the tourist GPS.

11. The system of claim 1, wherein any number of the at least one tourists may enter an excursion at any time during the excursion.

12. The system of claim 1, wherein any number of the at least one tourists may exit the excursion at any time during the excursion.

13. The system of claim 1, further comprising the step of each of the at least one tourists rating the excursion.

14. The system of claim 1, further comprising the step of the director sending an alert to each of the one or more tourists.

15. The system of claim 14, wherein an alert is sent upon one of the tourists moving outside a predetermined radius from the vehicle.

16. The system of claim 14, wherein an alert is sent upon one of the tourists moving within a predetermined radius from the vehicle.

17. The system of claim 1, further comprising the step of associating vehicle credentials with one of the created excursions created by the at least one director.

18. The system of claim 1, further comprising the step of inputting an excursion itinerary by the director.

19. The system of claim 1, further comprising a tourist excursion history for each tourist-completed excursion.

20. The system of claim 1, further comprising a director excursion history for each director-completed excursion.

* * * * *